(12) United States Patent
Mao et al.

(10) Patent No.: US 12,443,263 B2
(45) Date of Patent: Oct. 14, 2025

(54) DISPLAY SCREEN CONTROL METHOD AND ELECTRONIC DEVICE

(71) Applicant: HONOR DEVICE CO., LTD., Shenzhen (CN)

(72) Inventors: Lu Mao, Shenzhen (CN); Renpeng Li, Shenzhen (CN); Long Huang, Shenzhen (CN); Xingyu Liu, Shenzhen (CN); Yang Gao, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/553,711

(22) PCT Filed: May 16, 2022

(86) PCT No.: PCT/CN2022/093157
§ 371 (c)(1),
(2) Date: Oct. 2, 2023

(87) PCT Pub. No.: WO2023/016017
PCT Pub. Date: Feb. 16, 2023

(65) Prior Publication Data
US 2024/0184350 A1   Jun. 6, 2024

(30) Foreign Application Priority Data

Aug. 12, 2021   (CN) .......................... 202110923990.6

(51) Int. Cl.
*G06F 1/3234*   (2019.01)
*G06F 1/3231*   (2019.01)
(Continued)

(52) U.S. Cl.
CPC .......... *G06F 1/3265* (2013.01); *G06F 1/3231* (2013.01); *G06F 3/0488* (2013.01); *G06V 40/18* (2022.01)

(58) Field of Classification Search
CPC .... G06F 1/3265; G06F 1/3231; G06F 3/0488; G06V 40/18
(Continued)

(56) References Cited

U.S. PATENT DOCUMENTS 6,734,845 B1 * 5/2004 Nielsen ................... G06F 3/013
713/320
7,379,560 B2 * 5/2008 Bradski ................. G06F 1/3231
382/103

(Continued)

FOREIGN PATENT DOCUMENTS

CN   103514837 A   1/2014
CN   104965703 A   10/2015
(Continued)

*Primary Examiner* — Paul R. Myers
(74) *Attorney, Agent, or Firm* — Fish & Richardson P.C.

(57) ABSTRACT

This application provides a display screen control method and an electronic device. The method includes: An electronic device starts to perform detection based on a status of a display screen and a status of an optical proximity sensor and with reference to whether a user operation is received. In a detection process, if the electronic device detects target biometric feature information, the electronic device may control the display screen to change from a half-screen-off state to a screen-on state. Therefore, a display screen control method is provided, so that a user can turn on the display screen of the electronic device without needing to operate the electronic device. In addition, when a condition is met, the electronic device starts detection, so as to ensure real-time and efficient detection, and effectively reduce power consumption.

20 Claims, 29 Drawing Sheets

(51) Int. Cl.
*G06F 3/0488* (2022.01)
*G06V 40/18* (2022.01)

(58) Field of Classification Search
USPC .......................................................... 713/320
See application file for complete search history.

(56) References Cited

U.S. PATENT DOCUMENTS

| | | | |
|---|---|---|---|
| 9,619,020 B2* | 4/2017 | George-Svahn | G06F 3/0481 |
| 10,310,599 B1* | 6/2019 | Li | G06F 1/1694 |
| 10,698,479 B2* | 6/2020 | Fan | A61B 3/113 |
| 2002/0173344 A1* | 11/2002 | Cupps | G06F 3/04886 |
| | | | 455/566 |
| 2004/0225901 A1* | 11/2004 | Bear | G06F 1/3209 |
| | | | 713/300 |
| 2005/0199783 A1* | 9/2005 | Wenstrand | G06V 40/19 |
| | | | 250/214.1 |
| 2006/0294403 A1* | 12/2006 | Bennett | G06F 1/3203 |
| | | | 713/300 |
| 2010/0153764 A1* | 6/2010 | Pratt | G06F 3/011 |
| | | | 713/320 |
| 2012/0254602 A1* | 10/2012 | Bhansali | G06F 21/31 |
| | | | 713/2 |
| 2013/0135198 A1* | 5/2013 | Hodge | H04N 21/4436 |
| | | | 345/156 |
| 2014/0163751 A1* | 6/2014 | Davis | G08C 17/02 |
| | | | 700/286 |
| 2014/0287686 A1* | 9/2014 | Kobayashi | H04W 4/70 |
| | | | 455/41.2 |
| 2017/0293411 A1 | 10/2017 | Li et al. | |
| 2017/0371394 A1* | 12/2017 | Chan | G06F 1/3218 |
| 2018/0137668 A1* | 5/2018 | Mercati | G06F 8/41 |
| 2018/0182491 A1* | 6/2018 | Belliveau | A43B 3/34 |
| 2018/0239884 A1 | 8/2018 | Hsu et al. | |
| 2019/0004586 A1 | 1/2019 | Jeong et al. | |
| 2020/0245252 A1* | 7/2020 | Zhao | G06F 1/329 |
| 2022/0122514 A1* | 4/2022 | Kwon | G06F 1/1677 |

FOREIGN PATENT DOCUMENTS

| | | |
|---|---|---|
| CN | 105759939 A | 7/2016 |
| CN | 106445151 A | 2/2017 |
| CN | 108510961 A | 9/2018 |
| CN | 109117071 A | 1/2019 |
| CN | 109167873 A | 1/2019 |
| CN | 109788138 A | 5/2019 |
| CN | 111880640 A | 11/2020 |
| CN | 111970753 A | 11/2020 |
| WO | 2017215567 A1 | 12/2017 |

* cited by examiner

CONT. FROM FIG. 4(2)

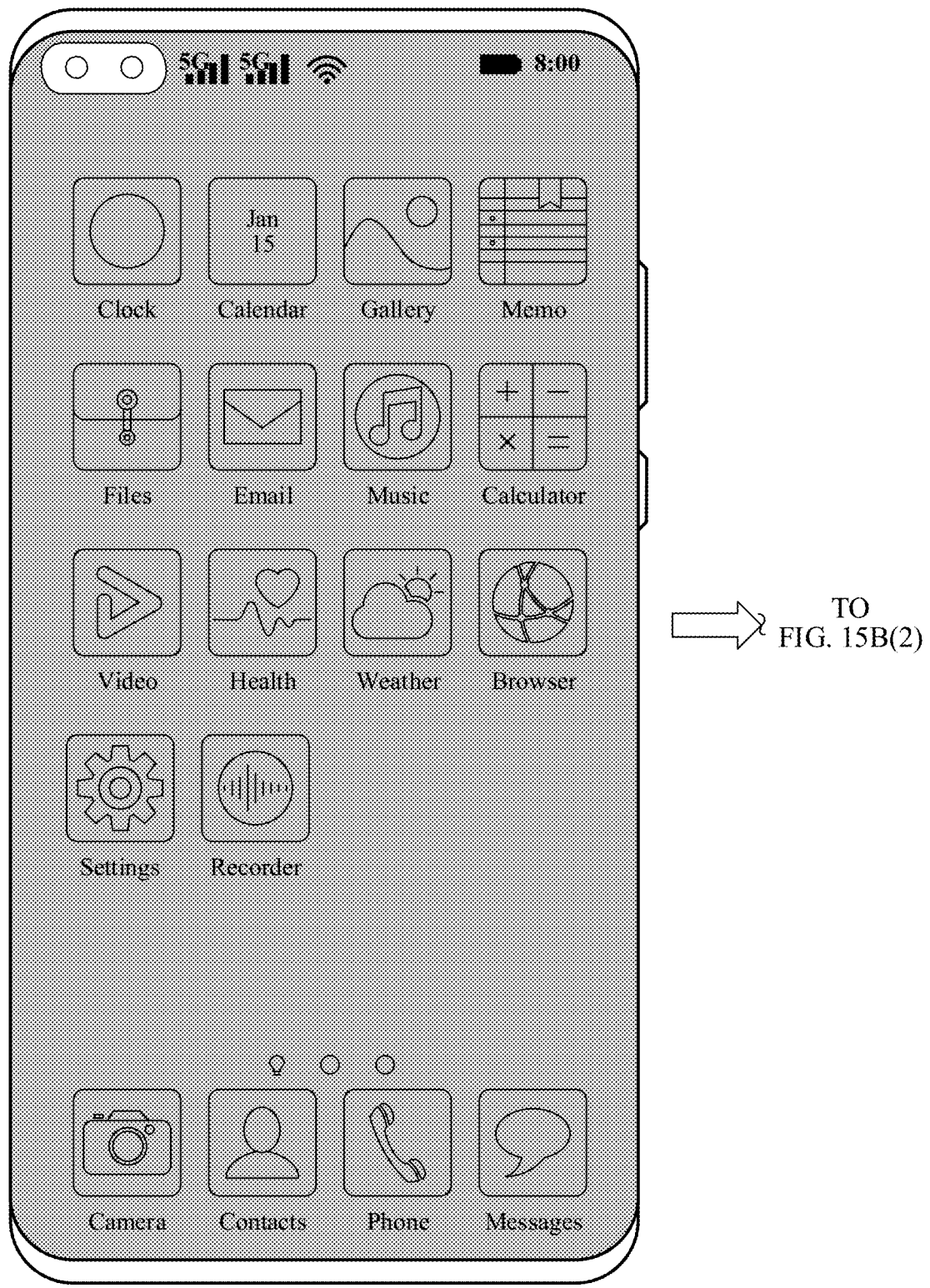
FIG. 15B(1)

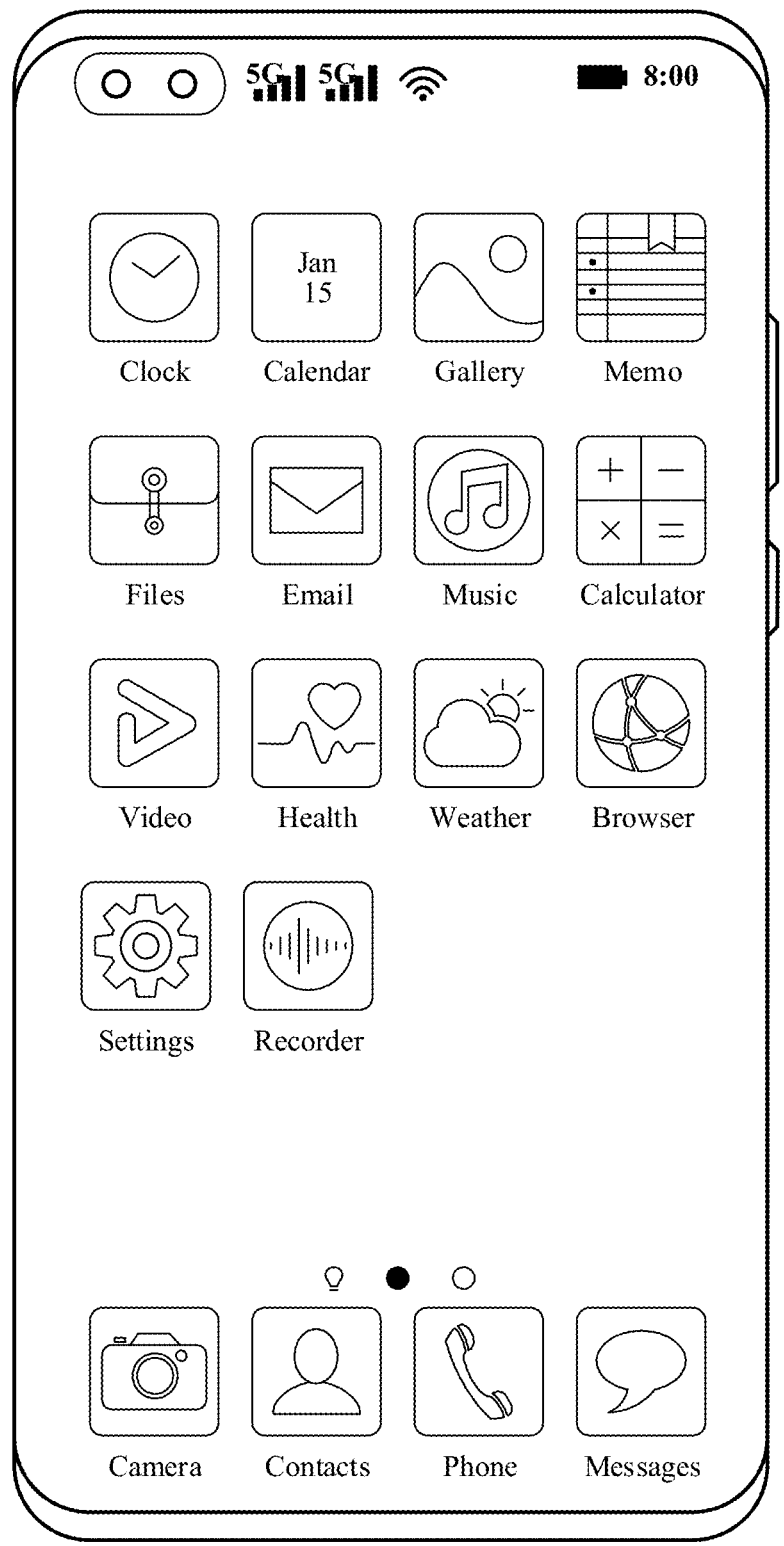
FIG. 15B(2)

CONT. FROM

CONT. FROM FIG. 21(1)

DISPLAY SCREEN CONTROL METHOD AND ELECTRONIC DEVICE

CROSS-REFERENCE TO RELATED APPLICATIONS

This application is a national stage of International Application No. PCT/CN2022/093157, filed on May 16, 2022, which claims priority to Chinese Patent Application No. 202110923990.6, filed on Aug. 12, 2021. The disclosures of the aforementioned applications are hereby incorporated by reference in their entireties.

TECHNICAL FIELD

This application relates to the field of terminal devices, and in particular, to a display screen control method and an electronic device.

BACKGROUND

Currently, in a screen-on state, if no user operation is received in a period of time, a mobile phone enters a screen-off state. That is, if a user expects the mobile phone to keep the screen-on state continuously, the user needs to touch the mobile phone or perform another operation before the mobile phone enters the screen-off state. However, in a read scenario or a scenario in which the user cannot conveniently operate the mobile phone, a manner of manually triggering the mobile phone to keep a screen-on state affects user experience.

SUMMARY

To resolve the foregoing problem, this application provides a display screen control method and an electronic device. In the method, the electronic device may control, based on biometric feature information, a display screen to turn on, thereby improving user experience.

According to a first aspect, this application provides an electronic device. The electronic device includes one or more processors, a memory, and a fingerprint sensor: and one or more computer programs, where the one or more computer programs are stored in the memory, and when the computer programs are executed by the one or more processors, the electronic device is enabled to perform the following steps: when the electronic device is in a screen-off state, receiving a first user operation: changing, by the electronic device, from the screen-off state to a screen-on state in response to the received first user operation: when the electronic device is in the screen-on state, no user operation is received within first duration, and an optical proximity sensor of the electronic device meets a preset condition, starting first detection: detecting, by the electronic device, biometric feature information in the first detection: at a first moment in the first detection, changing, by the electronic device, from the screen-on state to a half-screen-off state: and detecting, by the electronic device, first target biometric feature information at a second moment in the first detection, and changing, by the electronic device, from the half-screen-off state to the screen-on state. In this way, the electronic device may monitor statuses of modules and components of the electronic device based on a specified condition, so as to start to detect biometric feature information only when the specified condition is met. This avoids a problem of excessive system power consumption caused by continuous detection, effectively reduces system power consumption, and reduces battery power consumption. When specified biometric feature information is detected, the display screen of the electronic device turns on. Therefore, a manner of controlling the electronic device to turn on the screen is provided, so that the user can enable the display screen of the electronic device to turn on without needing to perform an operation, so as to improve user experience.

For example, the preset condition corresponding to the optical proximity sensor is that the optical proximity sensor is not shielded.

For example, if the optical proximity sensor does not meet the preset condition, the electronic device does not start the first detection.

For example, the first detection is optionally a detection window in this application.

For example, a first user operation may optionally be pressing a power key by the user.

For example, the electronic device may collect biometric feature information by using a camera.

For example, a frame rate at which the camera collects the biometric feature information may be 5 fps, thereby ensuring efficient and real-time detection, and reducing system power consumption.

According to the first aspect, when the computer programs are executed by the one or more processors, the electronic device is enabled to perform the following step: when the electronic device does not detect a user operation from a third moment at which the screen-off state changes to the screen-on state to the first moment, changing, by the electronic device, from the screen-on state to the half-screen-off state at the first moment. In this way, after the electronic device turns on the screen, if no user operation is received within specified duration, the electronic device changes from the screen-on state to the half-screen-off state.

For example, when in the screen-on state, brightness of the display screen is first brightness. In the half-screen-off state, the brightness of the display screen is second brightness, and the second brightness is less than the first brightness.

For example, when the display screen of the electronic device is in the screen-on state, the display screen may display a desktop, or an application interface.

According to the first aspect or any implementation of the first aspect, duration between the third moment and the first moment is second duration.

For example, the user may set the second duration between the third moment and the first moment in a display and brightness interface.

For example, the second duration may be 30 seconds, 1 minute, 5 minutes, 10 minutes, or the like.

According to the first aspect or any implementation of the first aspect, duration between a start moment of the first detection and the first moment is third duration, and the third duration is less than the second duration. In this way, the electronic device may set the first duration based on different second duration, so that duration between the start moment of detection and the moment of half-screen-off is fixed.

According to the first aspect or any implementation of the first aspect, when the computer programs are executed by the one or more processors, the electronic device is enabled to perform the following step: detecting the first target biometric feature information, and ending the first detection. In this way, after detecting the biometric feature information, the electronic device may end the current detection, so as to reduce power consumption.

According to the first aspect or any implementation of the first aspect, when the computer programs are executed by the one or more processors, the electronic device is enabled to perform the following steps: when the electronic device changes from the half-screen-off state to the screen-on state and does not receive a user operation within the first duration, and the optical proximity sensor meets the preset condition, starting second detection: and detecting a second target biometric feature at a fourth moment in the second detection, and controlling the electronic device to keep the screen-on state. In this way, by detecting the biometric feature information, the electronic device can control the display screen of the electronic device to remain in the screen-on state continuously without a need for the user to repeatedly operate the mobile phone, thereby improving user experience.

According to the first aspect or any implementation of the first aspect, when the computer programs are executed by the one or more processors, the electronic device is enabled to perform the following step: detecting the second target biometric feature, and ending the second detection.

According to the first aspect or any implementation of the first aspect, when the computer programs are executed by the one or more processors, the electronic device is enabled to perform the following steps: when the electronic device keeps the screen-on state and does not receive a user operation within the first duration, and the optical proximity sensor meets the preset condition, starting third detection; where duration of the third detection is the second duration: and detecting a third target biometric feature at a fifth moment in the third detection, and controlling the electronic device to keep the screen-on state. In this way, the electronic device may start detection each time the electronic device detects that a specified condition is met, so as to keep detection efficiency and reduce system power consumption.

According to the first aspect or any implementation of the first aspect, when the computer programs are executed by the one or more processors, the electronic device is enabled to perform the following step: detecting the third target biometric feature, and ending the second detection.

According to the first aspect or any implementation of the first aspect, duration between a start moment of the second detection and the fourth moment is fifth duration, and duration between a start moment of the third detection and the fifth moment is sixth duration; and the sixth duration is different from the fifth duration.

For example, in a continuous looking process of the user, the fifth duration and the sixth duration may be equal, for example, both are 1s.

For example, in an intermittent looking process of the user, the fifth duration and the sixth duration may be different.

According to the first aspect or any implementation of the first aspect, when the computer programs are executed by the one or more processors, the electronic device is enabled to perform the following steps: when the electronic device changes from the half-screen-off state to the screen-on state and does not receive a user operation within the first duration, and the optical proximity sensor meets the preset condition, starting fourth detection: and at a sixth moment in the fourth detection, detecting an operation of pressing a power key by a user, and changing, by the electronic device, from the screen-on state to the screen-off state. In this way, in a detection process, the user may continue to monitor a status of each module or component of the electronic device, and when a power key of the electronic device is pressed, the display screen of the electronic device turns off. In addition, the current detection ends.

According to the first aspect or any implementation of the first aspect, when the computer programs are executed by the one or more processors, the electronic device is enabled to perform the following step: detecting the operation of pressing the power key by the user, and ending the fourth detection.

According to the first aspect or any implementation of the first aspect, when the computer programs are executed by the one or more processors, the electronic device is enabled to perform the following steps: when the electronic device changes from the half-screen-off state to the screen-on state and does not receive a user operation within the first duration, and the optical proximity sensor meets the preset condition, starting fifth detection: and at a seventh moment in the fifth detection, receiving first voice incoming call information, and ending the fifth detection. In this way, when the electronic device enables a specific application, the electronic device may not need to perform detection, thereby further reducing power consumption. For example, the specific application may be a voice application, an application for enabling an application lock, or the like. For example, after a voice incoming call is connected to the electronic device, the screen turns off after preset duration.

According to the first aspect or any implementation of the first aspect, when the computer programs are executed by the one or more processors, the electronic device is enabled to perform the following steps: when the electronic device changes from the half-screen-off state to the screen-on state and does not receive a user operation within the first duration, and the optical proximity sensor meets the preset condition, starting sixth detection: detecting biometric feature information in the sixth detection; at an eighth moment in the sixth detection, changing, by the electronic device, from the screen-on state to the half-screen-off state: and at a ninth moment, the sixth detection ending, and changing, by the electronic device, from the half-screen-off state to the screen-off state. In this way, when the electronic device does not detect the biometric feature information, the electronic device ends detection when the screen is off.

According to the first aspect or any implementation of the first aspect, the first target biometric feature information is human eye feature information. In this way, the display screen may be controlled to turn on when it is determined that the user looks at the screen by means of recognizing eye looking in this application. Therefore, an intelligent manner of controlling the display screen to turn on is provided, so that the user does not need to manually operate the electronic device, thereby improving user experience.

According to the first aspect or any implementation of the first aspect, when the computer programs are executed by the one or more processors, the electronic device is enabled to perform the following steps: displaying a smart sensing interface, where the smart sensing interface includes a keep screen on while looking option; receiving an operation of tapping the keep screen on while looking option by a user, and determining that a keep screen on while looking function is enabled: and when the electronic device is in the screen-on state, no user operation is received within first duration, the optical proximity sensor of the electronic device meets the preset condition, and the keep screen on while looking option is enabled, starting first detection. In this way, when the user enables a keep screen on while looking function, the electronic device may execute the display screen control manner in this application.

According to a second aspect, this application provides a display screen control method. The method includes: when an electronic device is in a screen-off state, receiving a first user operation: changing from the screen-off state to a screen-on state in response to the received first user operation: when the electronic device is in the screen-on state, no user operation is received within first duration, and an optical proximity sensor of the electronic device meets a preset condition, starting first detection: detecting biometric feature information in the first detection: at a first moment in the first detection, changing, by the electronic device, from the screen-on state to a half-screen-off state: and detecting first target biometric feature information at a second moment in the first detection, and changing, by the electronic device, from the half-screen-off state to the screen-on state.

According to the second aspect, the changing, by the electronic device, from the screen-on state to a half-screen-off state includes: when the electronic device does not detect a user operation from a third moment at which the screen-off state changes to the screen-on state to the first moment, changing, by the electronic device, from the screen-on state to the half-screen-off state at the first moment.

According to the second aspect or any implementation of the second aspect, duration between the third moment and the first moment is second duration.

According to the second aspect or any implementation of the second aspect, duration between a start moment of the first detection and the first moment is third duration, and the third duration is less than the second duration.

According to the second aspect or any implementation of the second aspect, the method further includes: detecting the first target biometric feature information, and ending the first detection.

According to the second aspect or any implementation of the second aspect, the method further includes: when the electronic device changes from the half-screen-off state to the screen-on state and does not receive a user operation within the first duration, and the optical proximity sensor meets the preset condition, starting second detection: and detecting a second target biometric feature at a fourth moment in the second detection, and controlling the electronic device to keep the screen-on state.

According to the second aspect or any implementation of the second aspect, the method further includes: detecting the second target biometric feature, and ending the second detection.

According to the second aspect or any implementation of the second aspect, the method further includes: when the electronic device keeps the screen-on state and does not receive a user operation within the first duration, and the optical proximity sensor meets the preset condition, starting third detection: where duration of the third detection is the second duration: and detecting a third target biometric feature at a fifth moment in the third detection, and controlling the electronic device to keep the screen-on state.

According to the second aspect or any implementation of the second aspect, the method further includes: detecting the third target biometric feature, and ending the second detection.

According to the second aspect or any implementation of the second aspect, the method further includes: duration between a start moment of the second detection and the fourth moment is fifth duration, and duration between a start moment of the third detection and the fifth moment is sixth duration; and the sixth duration is different from the fifth duration.

According to the second aspect or any implementation of the second aspect, the method further includes: when the electronic device changes from the half-screen-off state to the screen-on state and does not receive a user operation within the first duration, and the optical proximity sensor meets the preset condition, starting fourth detection: and at a sixth moment in the fourth detection, detecting an operation of pressing a power key by a user, and changing, by the electronic device, from the screen-on state to the screen-off state.

According to the second aspect or any implementation of the second aspect, the method further includes: detecting the operation of pressing the power key by the user, and ending the fourth detection.

According to the second aspect or any implementation of the second aspect, the method further includes: when the electronic device changes from the half-screen-off state to the screen-on state and does not receive a user operation within the first duration, and the optical proximity sensor meets the preset condition, starting fifth detection: and at a seventh moment in the fifth detection, receiving first voice incoming call information, and ending the fifth detection.

According to the second aspect or any implementation of the second aspect, the method further includes: when the electronic device changes from the half-screen-off state to the screen-on state and does not receive a user operation within the first duration, and the optical proximity sensor meets the preset condition, starting sixth detection: detecting biometric feature information in the sixth detection: at an eighth moment in the sixth detection, changing, by the electronic device, from the screen-on state to the half-screen-off state: and at a ninth moment, the sixth detection ending, and changing, by the electronic device, from the half-screen-off state to the screen-off state.

According to the second aspect or any implementation of the second aspect, the method further includes: the first target biometric feature information is human eye feature information.

According to the second aspect or any implementation of the second aspect, the method further includes: displaying a smart sensing interface, where the smart sensing interface includes a keep screen on while looking option: receiving an operation of tapping the keep screen on while looking option by a user, and determining that a keep screen on while looking function is enabled: and when the electronic device is in the screen-on state, no user operation is received within first duration, the optical proximity sensor of the electronic device meets the preset condition, and the keep screen on while looking option is enabled, starting first detection.

The second aspect and any one of the implementations in the second aspect correspond to the first aspect and any one of the implementations in the first aspect respectively. For technical effects corresponding to any one of the second aspect or the implementations of the second aspect, refer to technical effects corresponding to any one of the first aspect or the implementations of the first aspect. Details are not described herein again.

According to a third aspect, this application provides a computer-readable medium, configured to store a computer program. The computer program includes instructions used to perform the method in the second aspect or any possible implementation of the second aspect.

According to a fourth aspect, this application provides a computer program. The computer program includes instructions used to perform the method in the second aspect or any possible implementation of the second aspect.

According to a fifth aspect, this application provides a chip. The chip includes a processing circuit and a transceiver pin. The transceiver pin and the processing circuit communicate with each other through an internal connection path, and the processing circuit performs the method according to the second aspect or any possible implementation of the second aspect, so as to control a receiving pin to receive a signal and control a sending pin to send a signal.

BRIEF DESCRIPTION OF DRAWINGS

FIG. 15B(1) and FIG. 15B(2) are a schematic diagram of an example state of a display screen of an electronic device;

DESCRIPTION OF EMBODIMENTS

Terms used in implementations of this application are merely intended to explain specific embodiments of this application rather than limit this application.

The following clearly and completely describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without making creative efforts shall fall within the protection scope of this application.

In this specification, the term "and/or" is merely used to describe an association relationship between associated objects, and indicates that three relationships may exist. For example, "A and/or B" may indicate the following: Only A exists, both A and B exist, and only B exists.

The terms "first", "second", and the like in the specification and claims of embodiments of this application are used to distinguish between different objects, and are not used to indicate a specific sequence of objects. For example, a first target object and a second target object are used to distinguish between different target objects, but are not used to describe a specific sequence of the target objects.

In the embodiments of this application, words such as "an example" or "for example" are used to represent giving an example, an illustration, or a description. Any embodiment or design solution described as "example" or "for example" in embodiments of this application should not be construed as being more preferred or advantageous than other embodiments or design solutions. Specifically, the words such as "example" or "for example" are used to present related concepts in a specific manner.

In the descriptions of embodiments of this application, unless otherwise specified, "a plurality of" means two or more. For example, a plurality of processing units refer to two or more processing units: and a plurality of systems refer to two or more systems.

Figure 1:
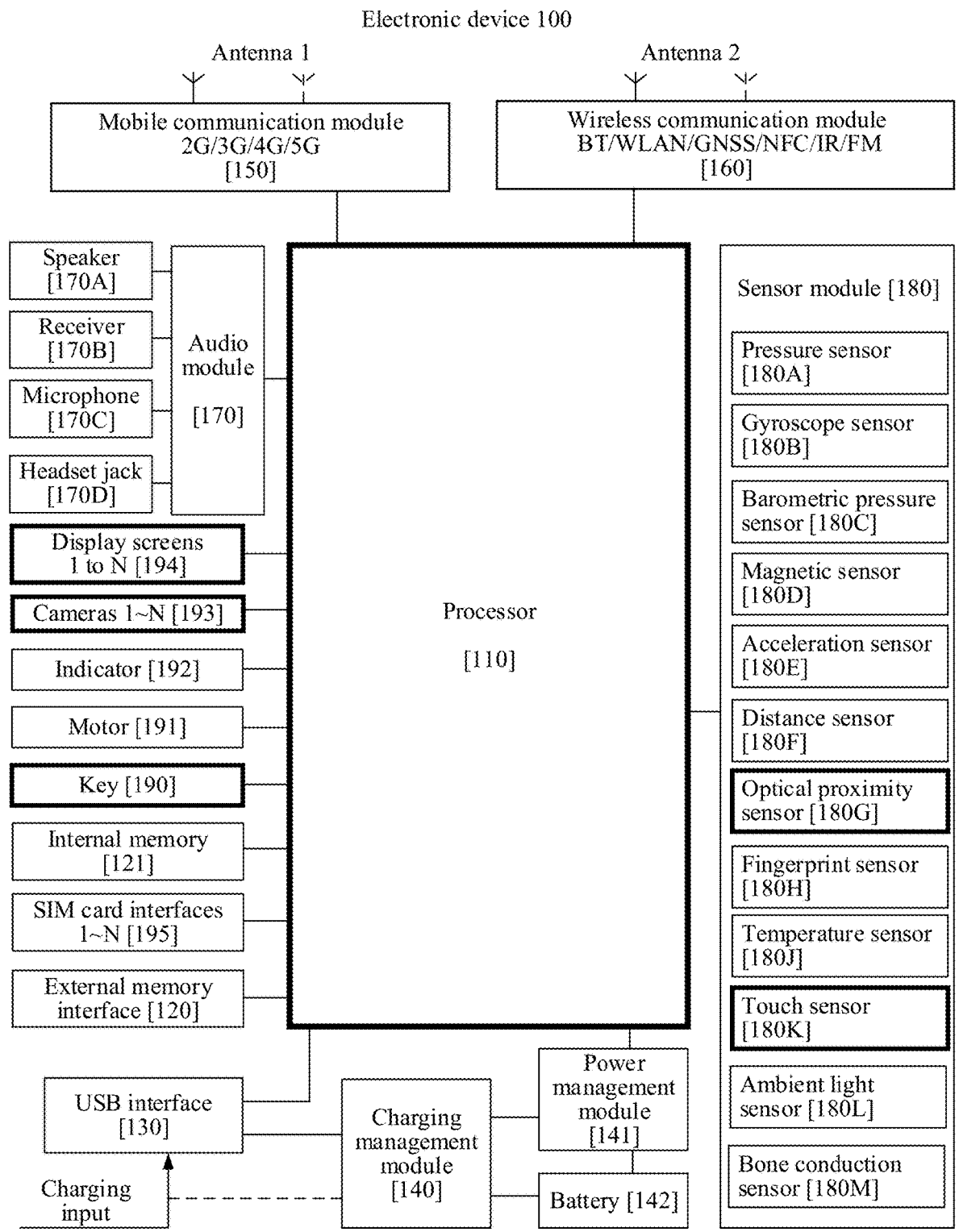
FIG. 1 is a schematic diagram of an example hardware structure of an electronic device.

FIG. 1 is a schematic diagram of a structure of an electronic device 100. It should be understood that the electronic device 100 shown in FIG. 1 is only an example of the electronic device, and the electronic device 100 may have more or fewer components than those shown in the figure, may combine two or a plurality of components, or may have a different component configuration. The components shown in FIG. 1 may be implemented by hardware that includes one or more signal processing and/or application-specific integrated circuits, software, or a combination of hardware and software. It should be noted that, in this embodiment of this application, the electronic device 100 is used as a mobile phone only for description. The electronic device in this embodiment of this application may alternatively be a device with a display screen, such as a tablet, a wearable device, a television, a smart home device, and an in-vehicle device. This is not limited in this application.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a key 190, a motor 191, an indicator 192, a camera 193, a display screen 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a range sensor 180F, an optical proximity sensor 180G, a fingerprint sensor 180H, a temperature sensor 180J, a touch sensor 180K, an ambient optical sensor 180L, a bone conduction sensor 180M, and the like.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent devices, or may be integrated into one or more processors.

The controller may be a nerve center and command center of the electronic device 100. The controller may generate an operation control signal based on an instruction operation code and a time sequence signal, so as to complete control over instruction fetching and instruction execution.

The processor 110 may further be configured with a memory configured to store an instruction and data. In some embodiments, the memory in the processor 110 is a cache memory. The memory may store instructions or data that is recently used or cyclically used by the processor 110. If the processor 110 needs to use the instruction or the data again, the instruction or the data may be directly invoked from the memory. Repeated access is avoided, and a waiting time of the processor 110 is reduced, thereby improving system efficiency.

In some embodiments, the processor 110 may include one or more interfaces. The interface may include an inter-integrated circuit (Inter-integrated Circuit, I2C) interface, an inter-integrated circuit sound (Inter-integrated Circuit Sound, I2S) interface, a pulse code modulation (Pulse Code Modulation, PCM) interface, and a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) port, and/or the like.

The I2C interface is a bidirectional synchronous serial bus, including a serial data line (serial data line, SDA) and a serial clock line (derail clock line, SCL). In some embodiments, the processor 110 may include a plurality of sets of I2C buses. The processor 110 may be separately coupled to the touch sensor 180K, a charger, a flashlight, the camera 193, and the like through different I2C bus interfaces. For example, the processor 110 may be coupled to the touch sensor 180K through the I2C interface, so that the processor 110 communicates with the touch sensor 180K through the I2C bus interface, thereby implementing a touch function of the electronic device 100.

The I2S interface may be configured for audio communication. In some embodiments, the processor 110 may include a plurality of sets of I2S buses. The processor 110 may be coupled to the audio module 170 by using the I2S bus, so as to implement communication between the processor 110 and the audio module 170. In some embodiments, the audio module 170 may transfer an audio signal to the wireless communication module 160 through the I2S interface, to implement a function of answering a call through a Bluetooth headset.

The MIPI may be configured to connect the processor 110 to a peripheral device such as the display screen 194 or the camera 193. The MIPI interface includes a camera serial interface (camera serial interface, CSI), a display serial interface (display serial interface, DSI), and the like. In some embodiments, the processor 110 and the camera 193 communicate with each other by using a CSI interface, so as to implement a photographing function of the electronic device 100. The processor 110 communicates with the display screen 194 through the DSI, to implement a display function of the electronic device 100.

The GPIO interface may be configured by software. The GPIO interface may be configured as a control signal, or may be configured as a data signal. In some embodiments, the GPIO interface may be configured to connect the processor 110 to the camera 193, the display screen 194, the wireless communication module 160, the audio module 170, the sensor module 180, and the like. The GPIO interface may alternatively be configured as an I2C interface, an I2S interface, a UART interface, a MIPI interface, or the like.

It may be understood that an interface connection relationship between the modules that is shown in this embodiment of this application is merely an example for description, and constitutes no limitation on the structure of the electronic device 100. In some other embodiments of this application, the electronic device 100 may alternatively use an interface connection manner different from that in the foregoing embodiment, or use a combination of a plurality of the interface connection manners.

The charging management module 140 is configured to receive a charging input from a charger. The charger may be a wireless charger, or may be a wired charger. In some wired charging embodiments, the charging management module 140 may receive a charging input of a wired charger through the USB port 130. In some embodiments of wireless charging, the charging management module 140 may receive a wireless charging input through a wireless charging coil of the electronic device 100. The charging management module 140, while charging the battery 142, may also supply power to the electronic device through a power management module 141.

The power management module 141 is configured to connect to the battery 142, the charging management module 140, and the processor 110. The power management module 141 receives input from the battery 142 and/or the charging management module 140, and supplies power to the processor 110, the internal memory 121, the external memory, the display screen 194, the camera 193, the wireless communication module 160, and the like. The power management module 141 may be further configured to monitor parameters such as a battery capacity, a quantity of battery cycles, and a battery health status (leakage and impedance). In some other embodiments, the power management module 141 may alternatively be disposed in the processor 110. In some other embodiments, the power management module 141 and the charging management module 140 may be disposed on a same device.

A wireless communication function of the electronic device 100 may be implemented through the antenna 1, the antenna 2, the mobile communication module 150, the wireless communication module 160, the modem processor, the baseband processor, or the like.

The antenna 1 and the antenna 2 are configured to transmit and receive an electromagnetic wave signal. Each antenna in the electronic device 100 may be configured to cover a single or a plurality of communication frequency bands. Different antennas may also be multiplexed to improve utilization of the antennas. For example, the antenna 1 may be multiplexed as a diversity antenna of a wireless local region network. In some other embodiments, the antenna may be used in combination with a tuning switch.

The mobile communication module 150 can provide a solution for wireless communication including 2G/3G/4G/5G and the like to be applied to the electronic device 100. The mobile communication module 150 may include at least one filter, a switch, a power amplifier, a low noise amplifier (low noise amplifier, LNA), and the like. The mobile communication module 150 may receive an electromagnetic wave by using the antenna 1, perform processing such as filtering and amplification on the received electromagnetic wave, and send the electromagnetic wave to the modem processor for demodulation. The mobile communication module 150 may further amplify a signal modulated by the modem processor, and convert the signal into an electromagnetic wave by using the antenna 1 for radiation. In some embodiments, at least some of functional modules of the mobile communication module 150 may be disposed in the processor 110. In some embodiments, at least some of the functional modules of the mobile communication module 150 may be disposed in a same device as at least some of modules of the processor 110.

The modem processor may include a modulator and a demodulator. The modulator is configured to modulate a to-be-sent low-frequency baseband signal into a medium-high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (not limited to the speaker 170A or the receiver 170B), or displays an image or a video by using the display screen 194. In some embodiments, the modem processor may be a separate device. In some other embodiments, the modem processor may be independent of the processor 110, and the modem processor and the mobile communication module 150 or another function module are disposed in a same device.

The wireless communication module 160 may provide a wireless communication solution that is applied to the electronic device 100, including a wireless local area network (wireless local area network, WLAN) (such as a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), an infrared (infrared, IR) technology, and the like. The wireless communication module 160 may be one or more devices that integrate at least one communication processing module. The wireless communication module 160 receives an electromagnetic wave by using the antenna 2, performs frequency modulation on and filters the electromagnetic wave signal, and sends a processed signal to the processor 110. The wireless communication module 160 may further receive a to-be-sent signal from the processor 110, perform frequency modulation on and amplify the to-be-sent signal, and convert the to-be-sent signal into an electromagnetic wave by using the antenna 2 for radiation.

In some embodiments, in the electronic device 100, the antenna 1 is coupled to the mobile communication module 150, and the antenna 2 is coupled to the wireless communication module 160, so that the electronic device 100 can communicate with a network and another device according to a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a Beidou navigation satellite system (beidou navigation satellite system, BDS), a quasi-zenith satellite system (quasi-zenith satellite system, QZSS), and/or a satellite based augmentation system (satellite based augmentation systems, SBAS).

The electronic device 100 implements a display function by using the GPU, the display screen 194, the application processor, and the like. The GPU is a microprocessor for image processing and is connected to the display screen 194 and the application processor. The GPU is configured to perform mathematical and geometric calculation, and is configured to render graphics. The processor 110 may include one or more GPUs, and the GPU executes a program instruction to generate or change display information.

The display screen 194 is configured to display an image, a video, and the like. The display screen 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flex light-emitting diode (flex light-emitting diode, FLED), a Miniled, a MicroLed, a Micro-oLed, a quantum dot light emitting diode (quantum dot light emitting diodes, QLED), or the like. In some embodiments, the electronic device 100 may include 1 or N display screens 194, where N is a positive integer greater than 1. For example, the processor may control a status of the display screen. Optionally, in this embodiment of this application, the status of the display screen includes screen on, half screen off, and screen off.

The electronic device 100 may implement a photographing function by using the ISP, the camera 193, the video codec, the GPU, the display screen 194, the application processor, and the like.

The ISP is configured to handle data returned by the camera 193. For example, during photographing, a shutter is opened, and light is transmitted to a camera photosensitive element by using a lens. An optical signal is converted into an electrical signal. The camera photosensitive element transmits the electrical signal to the ISP for processing, to convert the electrical signal into an image visible to naked eyes. The ISP may further perform algorithm optimization on noise, brightness, and a skin tone of the image. The ISP may further optimize parameters such as exposure and a color temperature of a photographing scenario. In some embodiments, the ISP may be provided in the camera 193.

The camera 193 is configured to capture a still image or a video. An object generates an optical image by using a lens and projects the optical image to a photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert it to a digital image signal. The ISP outputs the digital image signal to the DSP for processing. The DSP converts the digital image signal into an image signal in a standard form such as RGB or YUV. In some embodiments, the electronic device 100 may include one or N cameras 193. N is a positive integer greater than 1.

The digital signal processor is configured to process a digital signal. In addition to processing a digital image signal, the digital signal processor can further process another digital signal. For example, when the electronic device 100 performs frequency channel selection, the digital signal processor is configured to perform Fourier transformation and the like on frequency channel energy.

The video codec is configured to compress or decompress a digital video. The electronic device 100 may support one or more video codecs. In this way, the electronic device 100 may play or record videos in a plurality of encoding formats, for example, moving picture experts group (moving picture experts group, MPEG)1, MPEG2, MPEG3, and MPEG4.

The NPU is a neural-network (neural-network, NN) computing processor, quickly processes input information by referring to a structure of a biological neural network, for example, by referring to a mode of transfer between neurons in human brain, and may further perform self-learning continuously. Applications such as intelligent cognition of the electronic device 100 may be implemented by using the NPU, for example, image recognition, facial recognition, speech recognition, and text understanding.

The external memory interface 120 may be configured to connect an external memory card, such as a Micro SD card, to expand a storage capacity of the electronic device 100. The external memory card communicates with the processor 110 by using the external memory interface 120, to implement a data storage function, storing a file such as a music or a video in the external storage card.

The internal memory 121 may be configured to store computer executable program code, and the executable program code includes an instruction. The processor 110 runs the instructions stored in the internal memory 121, to perform various function applications and data processing of the electronic device 100. The internal memory 121 may include a program storage region and a data storage region. The program storage region may store an operating system, an application required by at least one function (such as a voice playing function and an image playing function), and the like. The data storage region may store data (such as audio data and an address book) and the like created during use of the electronic device 100. In addition, the internal memory 121 may include a high-speed random access memory, and may further include a non-volatile memory, such as at least one magnetic disk storage device, a flash memory device, or a universal flash storage (universal flash storage, UFS).

The electronic device 100 can implement audio functions (such as music playing and sound recording) by using the audio module 170, the speaker 170A, the receiver 170B, the microphone 170C, the headset jack 170D, the application processor, for example, music playing and audio recording.

The audio module 170 is configured to convert digital audio information into analog audio signal output, and is also configured to convert analog audio input into a digital audio signal. The audio module 170 may be further configured to encode and decode an audio signal. In some embodiments, the audio module 170 may be disposed in the processor 110, or some functional modules in the audio module 170 are disposed in the processor 110.

The pressure sensor 180A is configured to sense a pressure signal, and is capable of converting the pressure signal to an electrical signal. In some embodiments, the pressure sensor 180A may be disposed on the display screen 194. There are many types of pressure sensors 180A, for example, a resistive pressure sensor, an inductive pressure sensor, and a capacitive pressure sensor. The capacitive pressure sensor may include at least two parallel plates having an electrically conductive material. When force is applied to the pressure sensor 180A, a capacitance between electrodes changes. The electronic device 100 determines strength of the pressure based on the change of the capacitance. When a touch operation is performed on the display screen 194, the electronic device 100 detects intensity of the touch operation by using the pressure sensor 180A. The electronic device 100 may calculate a touch position based on a detected signal of the pressure sensor 180A. In some embodiments, touch operations that are applied to a same touch location but have different touch operation intensity may correspond to different operation instructions. For example, when a touch operation whose touch operation strength is less than a first pressure threshold is performed on an SMS message application icon, an instruction of checking an SMS message is executed. For example, when a touch operation whose touch operation intensity is greater than or equal to the first pressure threshold is performed on the Messages application icon, an instruction for creating a new SMS message is executed.

The gyroscope sensor 180B may be configured to determine a motion posture of the electronic device 100. In some embodiments, the angular velocity of the electronic device 100 around three axes (i.e., x, y, and z axes) may be determined by using the gyroscope sensor 180B. The gyroscope sensor 180B may be used for image stabilization in image capture. For example, when a shutter is pressed, the gyroscope sensor 180B detects an angle of jitter of the electronic device 100, and calculates, according to the angle meter, a distance that needs to be compensated by the lens module, so that the lens cancels jitter of the electronic device 100 by using a reverse motion, thereby implementing anti-jitter. The gyroscope sensor 180B may be further used in a navigation scenario and a motion sensing game scenario.

The barometric pressure sensor 180C is configured to measure atmospheric pressure. In some embodiments, the electronic device 100 calculates an altitude, assists positioning and navigation based on a barometric pressure value measured by the barometric pressure sensor 180C.

The magnetic sensor 180D may include a Hall sensor. The electronic device 100 may detect opening and closing of the flip cover sleeve by using the magnetic sensor 180D. In some embodiments, when the electronic device 100 is a flip-flop, the electronic device 100 may detect opening and closing of the flip-flop according to the magnetic sensor 180D: and further set features such as automatic unlocking of the flip cover based on a detected opening or closing state of the leather case and a detected opening or closing state of the flip cover.

The acceleration sensor 180E may detect magnitudes of acceleration in various directions (usually on three axes) of the electronic device 100, and may detect magnitude and a direction of gravity when the electronic device 100 is still. The acceleration sensor 170C may be further configured to recognize a posture of the electronic device, and is applied to applications such as landscape and portrait orientation switching and a pedometer.

The distance sensor 180F is configured to measure a distance. The electronic device 100 may measure a distance by using infrared or laser. In some embodiments, in a photographing scene, the electronic device 100 may measure a distance by using the distance sensor 180F, to implement fast focusing.

The optical proximity sensor 180G may include, for example, a light-emitting diode (LED) and an optical detector such as a photodiode. The light-emitting diode may be an infrared light-emitting diode. The electronic device 100 emits infrared light by using a light emitting diode. The electronic device 100 detects infrared reflected light from a nearby object by using a photodiode. When abundant reflected light is detected, it may be determined that an object exists near the electronic device 100. When insufficient reflected light is detected, the electronic device 100 may determine that there is no object near the electronic device 100. The electronic device 100 may detect, by using the optical proximity sensor 180G, that the user holds the electronic device 100 close to the ear, so as to automatically turn off the screen to save power. The optical proximity sensor 180G may alternatively be used in a leather case mode or a pocket mode to automatically unlock or lock a screen.

The ambient light sensor 180L is configured to sense brightness of ambient light. The electronic device 100 may adaptively adjust the brightness of the display screen 194 according to the perceived ambient brightness. The ambient light sensor 180L may also be configured to automatically adjust the white balance in photographing. The ambient light sensor 180L can further cooperate with the optical proximity sensor 180G to detect whether the electronic device 100 is in a pocket, to prevent accidental touch.

The fingerprint sensor 180H is configured to collect a fingerprint. The electronic device 100 may implement fingerprint unlocking, access application lock, fingerprint photographing, and fingerprint receiving by using the collected fingerprint feature.

The temperature sensor 180J is configured to detect a temperature. In some embodiments, the electronic device 100 performs a temperature handling policy based on the temperature detected by the temperature sensor 180J. For example, when a temperature reported by the temperature sensor 180J exceeds a threshold, the electronic device 100 degrades performance of a processor located near the temperature sensor 180J, to reduce power consumption and implement thermal protection. In other embodiments, when the temperature is below another threshold, the electronic device 100 heats the battery 142 to avoid abnormal shutdown of the electronic device 100 due to low temperature. In some other embodiments, when the temperature is less than still another threshold, the electronic device 100 boosts an output voltage of the battery 142, to avoid abnormal power-off caused by the low temperature.

The touch sensor 180K is also called a "touch panel". The touch sensor 180K may be disposed in the display screen 194, and the touch sensor 180K and the display screen 194 constitute a "touchscreen". The touch sensor 180K is configured to detect a touch operation on or near the touch sensor. The touch sensor may transmit the detected touch operation to the application processor, to determine a touch event type. The touch sensor 180K may provide a visual output related to the touch operation by using the display screen 194. In some other embodiments, the touch sensor 180K may alternatively be disposed on a surface of the electronic device 100, and is at a position different from that of the display screen 194.

The bone conduction sensor 180M may obtain a vibration signal. In some embodiments, the bone conduction sensor 180M may obtain a vibration signal of a vibration bone in a human vocal-cord part. The bone conduction sensor 180M may also be in contact with a human pulse to receive a blood pressure pulse signal. In some embodiments, the bone conduction sensor 180M may alternatively be disposed in a headset, to form a bone conduction headset in combination with the headset. The audio module 170 may obtain a speech signal through parsing based on the vibration signal that is of the vibration bone in the vocal-cord part and that is obtained by the bone conduction sensor 180M, to implement a speech function. The application processor may parse heart rate information based on the blood pressure pulse signal obtained by the bone conduction sensor 180M, to implement a heart rate detection function.

The key 190 includes a power key, a volume key, and the like. The key 190 may be a mechanical key, or a touch-type key. The electronic device 100 may receive a key input, and generate a key signal input related to user setting and function control of the electronic device 100. For example, in this embodiment of this application, the processor may determine, based on a trigger status of the proximity sensor, the touch sensor, and/or the power key, whether an always on condition is met. Specific details are described in detail in the following embodiments.

The motor 191 may generate a vibration prompt. The motor 191 may be configured to provide a vibration prompt for an incoming call, and may be further configured to provide a touch vibration feedback. For example, touch operations applied to different applications (for example, photographing, audio playback, or the like) may correspond to different vibration feedback effects. The motor 191 may also correspond to different vibration feedback effects for touch operations applied to different regions of the display screen 194. Different application scenarios (for example, a time reminder, information receiving, an alarm clock, and a game) may further correspond to different vibration feedback effects. A touch vibration feedback effect may be further customized.

The indicator 192 may be an indicator light, which may be configured to indicate a charging state and a power change, or to indicate a message, a missed call, a notification, or the like.

A software system of the electronic device 100 may use a layered architecture, an event-driven architecture, a microkernel architecture, a micro-service architecture, or a cloud architecture. In this embodiment of this application, a software structure of the electronic device 100 is described by using an example of an Android system with a hierarchical architecture.

Figure 2:
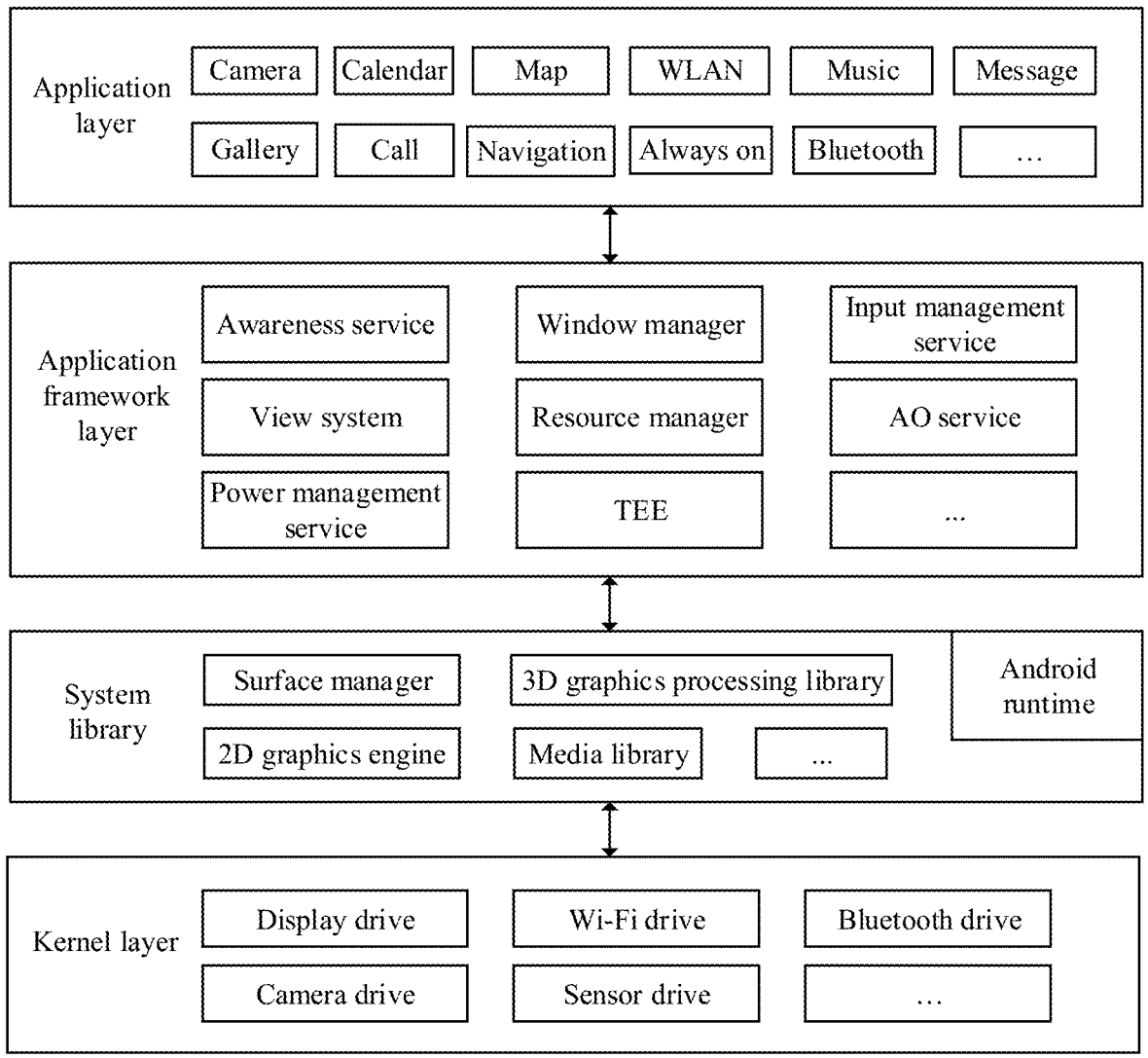
FIG. 2 is a schematic diagram of an example software structure of an electronic device.

FIG. 2 is a block diagram of a software structure of an electronic device 100 according to an embodiment of this application.

In the layered architecture of the electronic device 100, software is divided into several layers, and each layer has a clear role and task. The layers communicate with each other by using a software interface. In some embodiments, the Android system is divided into four layers: an application layer, an application framework layer, an Android runtime (Android runtime) and system library layer, and a kernel layer from top down.

The application layer may include a series of application packages.

As shown in FIG. 2, the application packages may include applications such as Camera, Gallery, Calendar, Calls, Map, Navigation, WLAN, Bluetooth, Music, Video, Messages, and non-screen-off. For example, the always on application program (or may be referred to as an always on application) may be configured to control the electronic device to perform non-screen-off detection, and may control the electronic device not to be screen-off, that is, to be in a screen-on and unlock state.

The application framework layer provides an application programming interface (application programming interface, API) and a programming framework for an application at the application layer. The application framework layer includes some predefined functions.

As shown in FIG. 2, the application framework layer may include a window manager, a view system, a resource manager, an awareness service, an input management service (Input Manager Service), an AO (always on, always on, also referred to as non-screen-off) service, a trusted execution environment (trusted execution environment, TEE), a power management service, and the like.

The window manager is configured to manage a window application. The window manager may obtain a size of the display screen, determine whether there is a status bar, lock the screen, take a screenshot, and the like.

The view system includes visual controls, for example, a control for displaying text and a control for displaying a picture. The view system may be configured to construct an application. A display interface may include one or more views. For example, a display interface including an SMS notification icon may include a view for displaying text and a view for displaying a picture.

The resource manager provides various resources such as a localized character string, an icon, an image, a layout file, and a video file for an application.

The input management service is used to manage an input part of an entire system, and includes a key (for example, a HOME key or a power key) keyboard, a mouse, a touchscreen, and the like.

The power management service is used to provide an interface for the always on application system, so that the always on application can control, by using the interface provided by the power management service, the display screen of the electronic device not to turn off.

The AO service may also be referred to as a low-power AO service. The AO service starts after the always on application is triggered by using the awareness service, and whether an eye is looking may be recognized by using a pre-stored detection algorithm, for example, a face recognition algorithm or an eye looking recognition algorithm. A recognition result is reported to the awareness service after it is recognized that an eye is looking.

The awareness service is used to subscribe to management and provide an interface. For example, the awareness service may be invoked by a plurality of applications or services. The awareness service may establish a corresponding process for each application or service by means of subscription management, and transmit, based on the process corresponding to the application or the service, data uploaded by an underlying module to different applications or services. For example, the awareness service may provide an interface for an upper-layer application, so as to invoke the underlying module based on a requirement of the application. For example, the awareness service may receive an indication signal from the always on application by using the interface between the awareness service and the always on application. In response to the indication from the always on application, the awareness service may invoke a corresponding module or service by using an interface with another module or service, for example, invoke an input management service, a power management service, and the like in response to the indication from the always on application.

The TEE is used to isolate a highly secure and sensitive application from a common software environment, provide a dedicated trusted execution environment TEE, and protect confidentiality, integrity, and an access permission of a resource and data of the application. An application executed on a TEE side is referred to as a trusted application (trusted application, TA), for example, an application that executes a key service such as a signature or encryption/decryption calculation. Because the TA runs in the trusted execution environment TEE, a deployment/upgrade operation of the TA needs to strictly follow a security verification specification of a TEE issuer (usually a terminal manufacturer), for example, a digital signature is used to ensure that all steps of the TEE are truly trusted. Optionally, in this embodiment of this application, the TEE may be used to store an image collected by a camera, so as to protect privacy of a user. The AO service may detect a graph in the TEE based on a detection algorithm to determine whether a face is included in the image and whether looking exists. Specific details are described in the following embodiments.

The Android Runtime includes a kernel library and a virtual machine. The Android runtime is responsible for scheduling and management of the Android system.

The kernel library includes two parts: one part is a functional function that needs to be invoked by a java language, and the other part is the kernel library of Android.

The application layer and the application framework layer are run in the virtual machine. The virtual machine executes java files of the application layer and the application framework layer as binary files. The virtual machine is used to execute functions such as object lifecycle management, stack management, thread management, security and exception management, and garbage collection.

The system library may include a plurality of function modules, For example, a surface manager (surface manager), a media library (Media Libraries), a three-dimensional graphics processing library (for example, OpenGL ES), and a 2D graphics engine (for example, SGL).

The surface manager is used to manage a display subsystem and provide fusion of 2D and 3D layers for a plurality of applications.

The media library supports playback and recording in a plurality of commonly used audio and video formats, and static image files. The media library may support a plurality of audio and video coding formats, for example, MPEG4, H.264, MP3, AAC, AMR, JPG, and PNG.

The three-dimensional graphics processing library is configured to implement drawing of three-dimensional graphics, image rendering, synthesis, layer processing, and the like.

The 2D graphics engine is a drawing engine for 2D graphics.

The kernel layer is a layer between hardware and software. The kernel layer includes at least a display drive, a camera drive, a Bluetooth drive, and a sensor drive.

It may be understood that the components included in the application framework layer, the system library, and the runtime layer shown in FIG. 2 do not constitute a specific limitation on the electronic device 100. In some other embodiments of this application, the electronic device 100 may include more or fewer components than those shown in the figure, or combine some components, or split some components, or have different component arrangements.

Figure 3A:
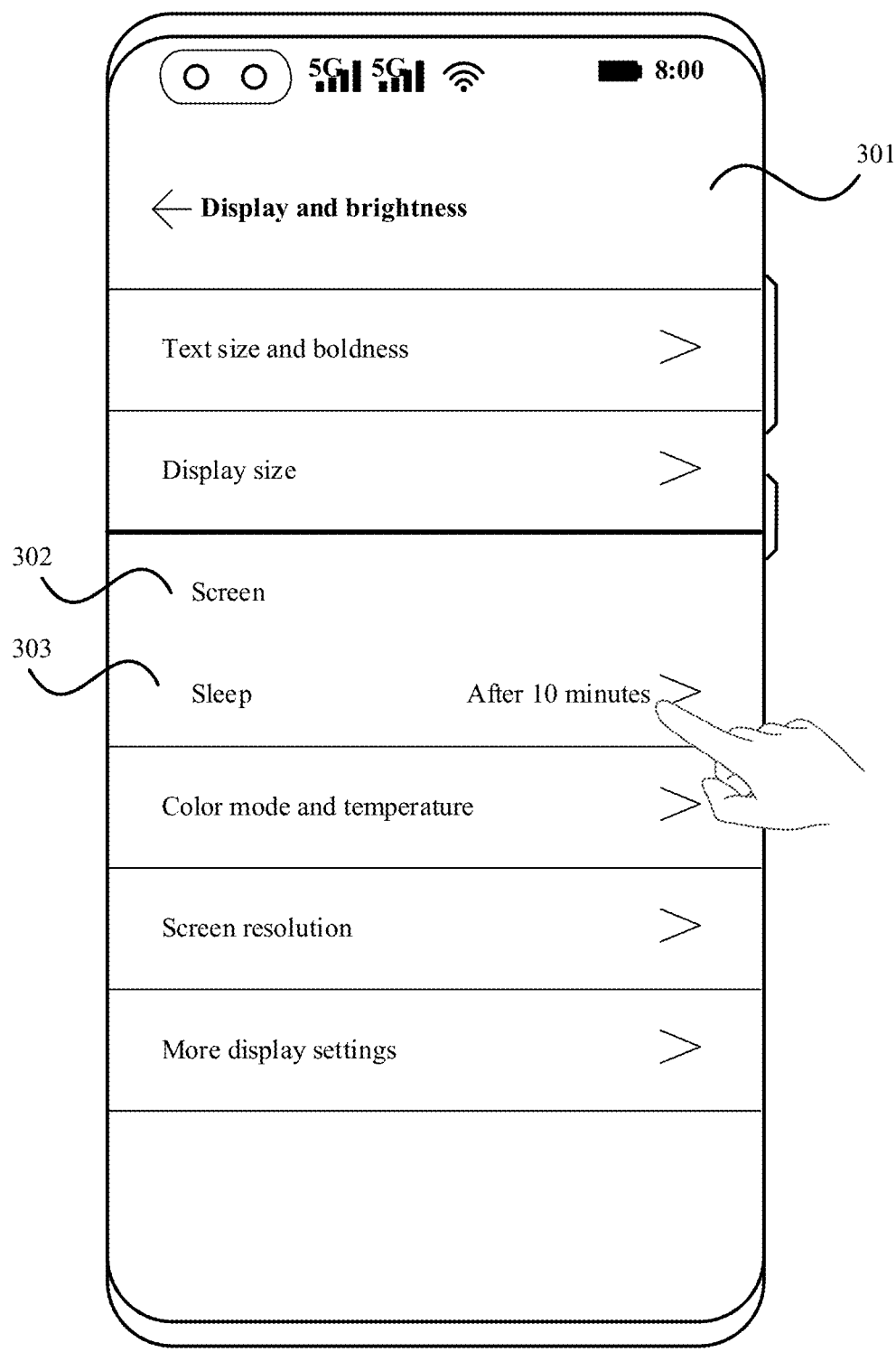
FIG. 3a is a schematic diagram of an example user interface.

FIG. 3a is a schematic diagram of an example user interface. Referring to FIG. 3, for example, a display and brightness interface 301 includes one or more options. The options include but are not limited to: a text size and boldness, a display size, a screen option 302, and the like. It should be noted that, because of the size display displayed on the interface, the options displayed on the display and brightness interface 301 are only some of options in display and brightness settings.

Example screen option 302 includes one or more options, including but not limited to: a sleep option 303, a color mode and temperature, screen resolution, and more display settings. The sleep option 303 is used to set a screen-off time of the screen. For example, the sleep option 303 currently indicates that sleep duration is 10 minutes, that is, the mobile phone turns off the screen after 10 minutes when the screen is on and no user operation (including a touch operation, a key operation, and the like) is performed.

Figure 3B:
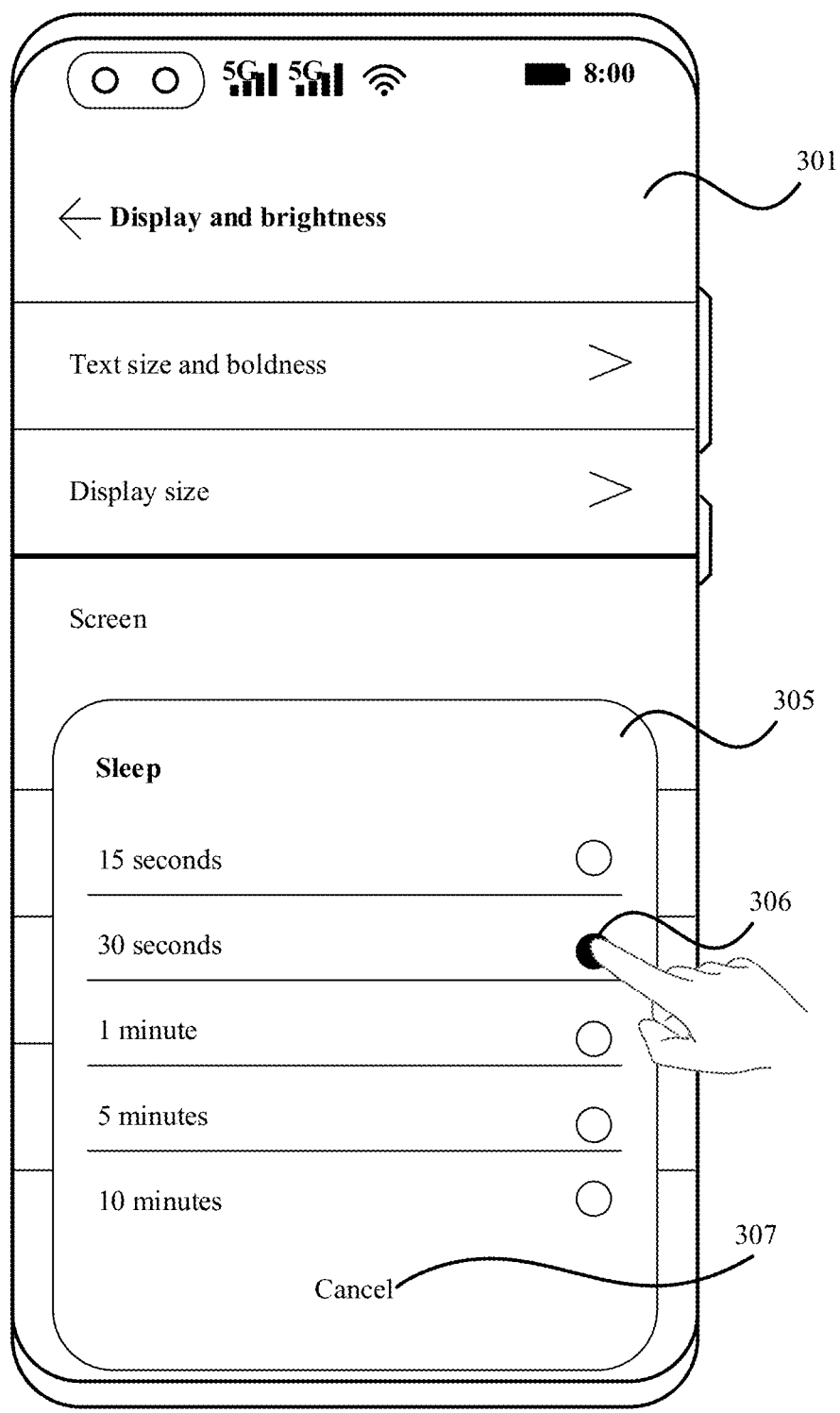
FIG. 3b is a schematic diagram of an example user interface.

Still referring to FIG. 3a, for example, a user taps the sleep option 303. Referring to FIG. 3b, in response to the received user tap operation, the mobile phone displays a sleep option box 306 at a lower part of the display and brightness interface 301. It should be noted that, a size and a location of the sleep option box 306 are merely examples, and are not limited in this application.

For example, the sleep option box 306 includes but is not limited to: a 15 seconds option, a 30 seconds option 306, a 1 minute option, a 5 minutes option, a 10 minutes option, and a cancel option 307. It should be noted that a value and a quantity of options are merely examples, and are not limited in this application. If the user taps the cancel option 307, the electronic device cancels display of the sleep option box 306 in response to the received user operation.

Figure 3C:
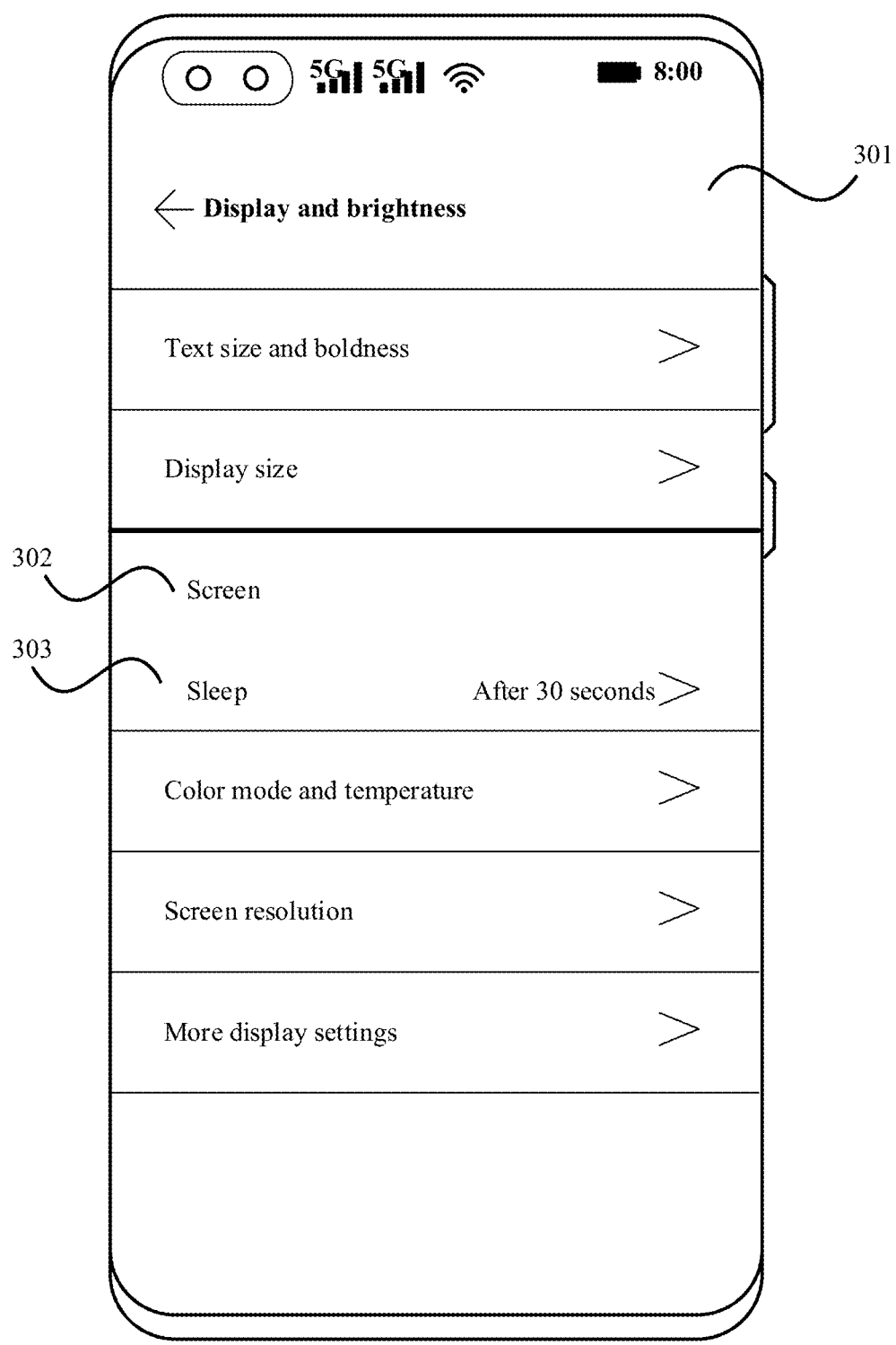
FIG. 3c is a schematic diagram of an example user interface.
Figure 4:
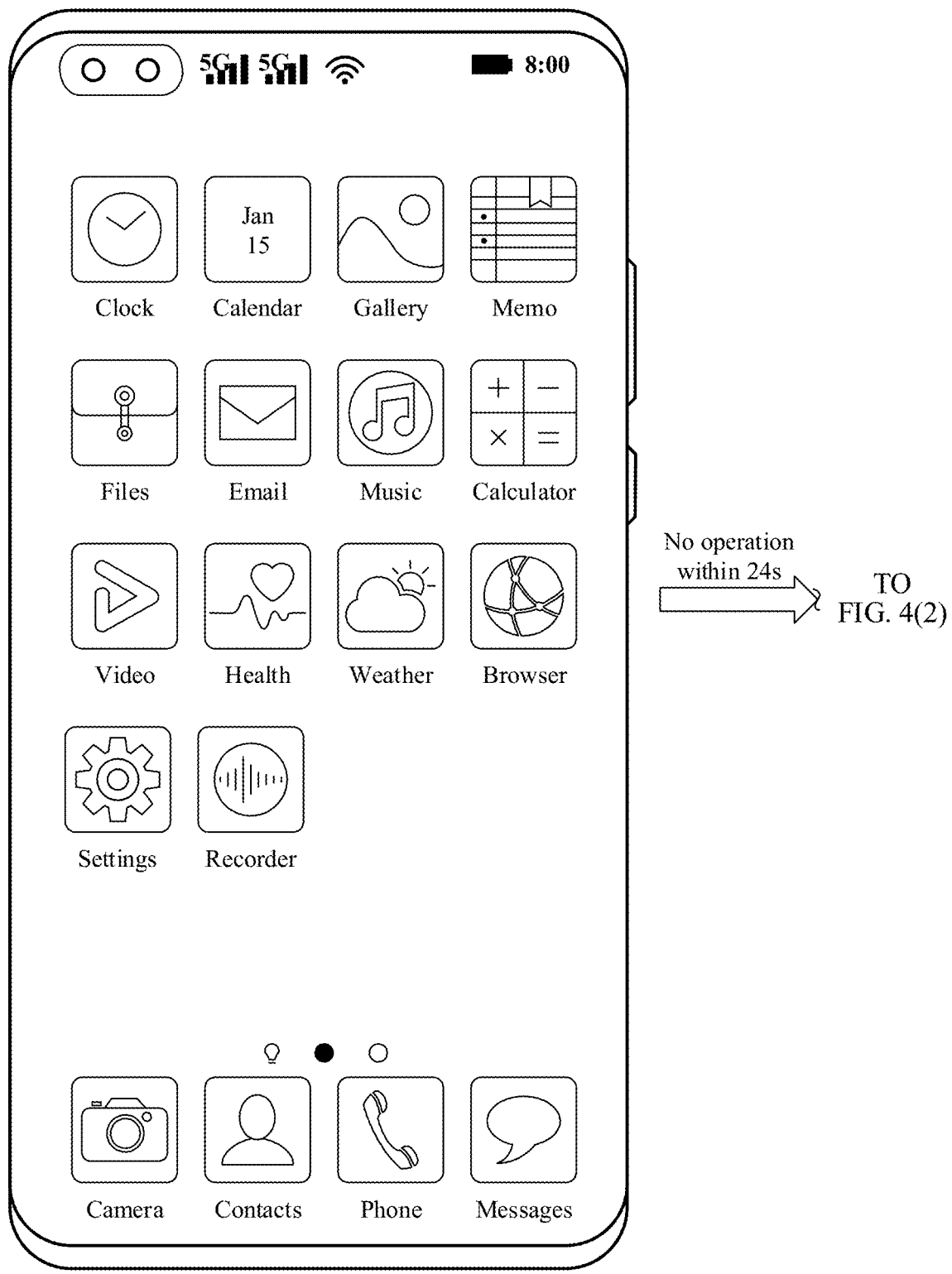
FIG. 4(1) to FIG. 4(3) are a schematic diagram of an example state of a display screen of an electronic device.
Figure 4:
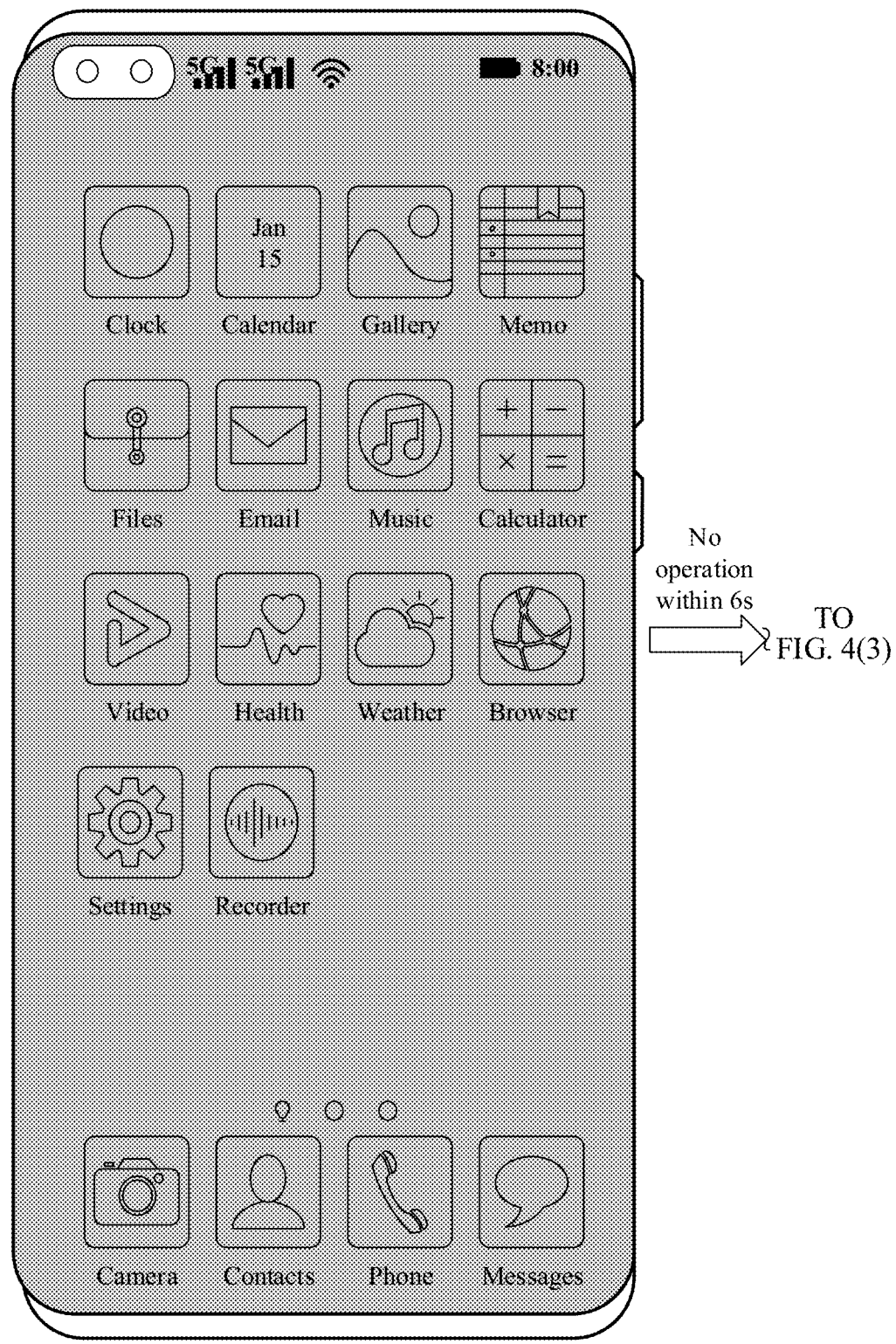
Figure 4:
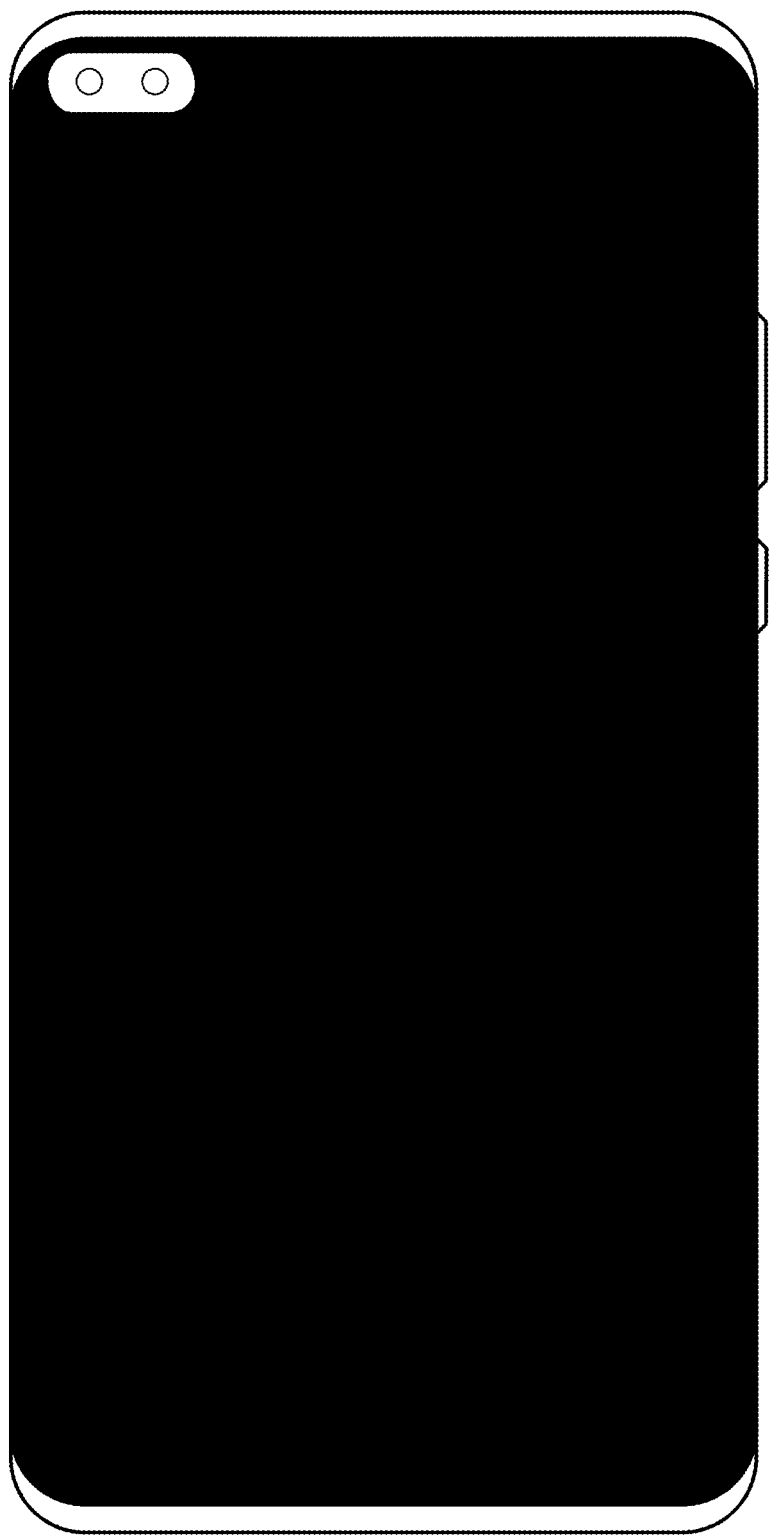

For example, the user taps the 30 seconds option 306. Referring to FIG. 3c, in response to the received user operation, the mobile phone displays an updated sleep parameter in the sleep option 303 in the display and brightness interface 301, that is, displays "after 30 seconds". For example, referring to FIG. 4(1), the mobile phone displays a desktop. It should be noted that, the mobile phone may enter the desktop from a lock screen interface, or may transition from another application to the desktop. For example, the mobile phone enters the desktop in response to a received unlock operation of the user. The mobile phone detects, from a last (or may be understood as the latest) moment of receiving a user operation, whether a user operation is received. Optionally, as shown in FIG. 4(2), if no user operation is received in within 24 s, the mobile phone enters a half-screen-off mode. It may be understood that the display screen of the mobile phone is darkened. A degree of darkening of the display screen may be set based on an actual requirement, which is not limited in this application. It should be noted that, when the mobile phone is in the half-screen-off mode, applications and modules in the mobile phone run normally. For example, in the half-screen-off mode, the mobile phone can still receive a user operation, and turn on the screen again in response to the received user operation.

Referring to FIG. 4(3), for example, when the mobile phone is in the half-screen-off mode, if no user operation is detected within 6 s, the mobile phone enters a screen-off mode. Optionally, the screen-off mode may be understood as that the screen of the mobile phone is locked, and the display screen of the mobile phone is off (that is, a black screen).

However, in some scenarios, when the user is using the mobile phone and cannot perform an operation on the mobile phone, if the user expects the mobile phone to turn on the screen, and the mobile phone is set with the sleep mode, the mobile phone turns off the screen 30 seconds later if no operation is performed. For example, if the user browses a menu by using the mobile phone in a cooking process, in this case, it is inconvenient for the user to operate the mobile phone. After detecting that the user does not operate within 30 seconds, the mobile phone sleeps. In a manner of resolving the problem, currently, the sleep option is changed, for example, longer sleep duration is selected, or no sleep is selected. In fact, more scenarios are as follows: The user has started cooking and cannot operate the mobile phone by using the hand. In this case, it is inconvenient for the user to change the sleep option. In this case, user experience is affected.

Figure 5:
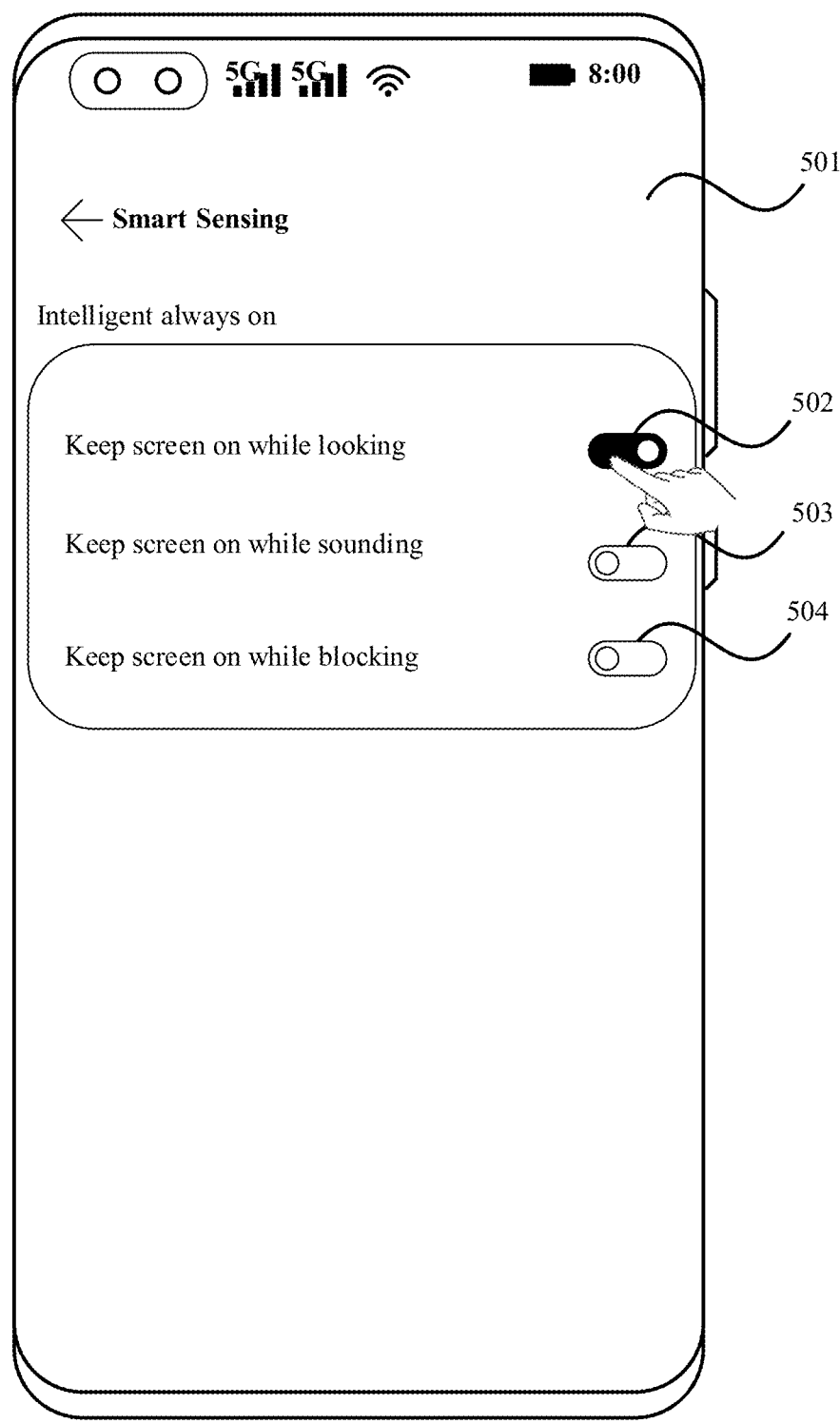
FIG. 5 is a schematic diagram of an example user interface.

An embodiment of this application provides a method for implementing non-screen-off. When an always on condition is met, the mobile phone may be controlled not to be screen-off, so as to improve user experience. FIG. 5 is a schematic diagram of an example user interface. Referring to FIG. 5, for example, a smart sensing interface 501 includes but is not limited to an intelligent always on option box and an air gesture option box. Optionally, the intelligent always on option box includes but is not limited to: a keep screen on while looking option 502, a keep screen on while sounding option 503, and a keep screen on while blocking option 504.

For example, if the user may tap the keep screen on while looking option 502 to trigger a keep screen on while looking function. In this embodiment of this application, after the keep screen on while looking function (which may also be referred to as a keep screen on while looking service) is enabled in response to the received user operation, the mobile phone keeps the mobile phone in the screen-on state based on detection of user gaze. A specific embodiment is described in the following embodiment. Details are not described herein.

For example, if the user taps the keep screen on while sounding option 503, in this embodiment of this application, after a keep screen on while sounding function is enabled in response to the received user operation, the mobile phone keeps the mobile phone in the screen-on state based on a detected sound.

For example, if the user taps the keep screen on while blocking option 504, in this embodiment of this application, after a keep screen on while blocking function is enabled in response to the received user operation, the mobile phone keeps the mobile phone in the screen-on state based on a blocked state in which the optical proximity sensor is blocked.

It should be noted that, in this embodiment of this application, keep screen on while looking, keep screen on while sounding, and keep screen on while blocking are only used as examples for description. That is, the mobile phone may determine, based on whether it is being looked at, whether a specific sound is monitored, whether blocking is detected as a condition, whether to keep the screen on. In other embodiments, the mobile phone may further control the screen-on state of the display screen based on another condition, for example, a condition such as whether a blink is detected, a specific gesture is detected, or whether a knock is detected, which is not limited in this application. Correspondingly, options corresponding to different conditions may be displayed in the intelligent always on option box, for example, may include a keep screen on while blinking option.

It should be further noted that, as described above, the intelligent always on option box optionally includes a plurality of options. The user may choose to disable all options, or may choose to enable one or more options, which is not limited in this application. For example, if the user enables the keep screen on while looking option 502 and the keep screen on while sounding option 503, the mobile phone may control, in a detection process, the mobile phone to keep in the screen-on state after detecting that the user is looking and/or receiving a specified sound.

Figure 6:
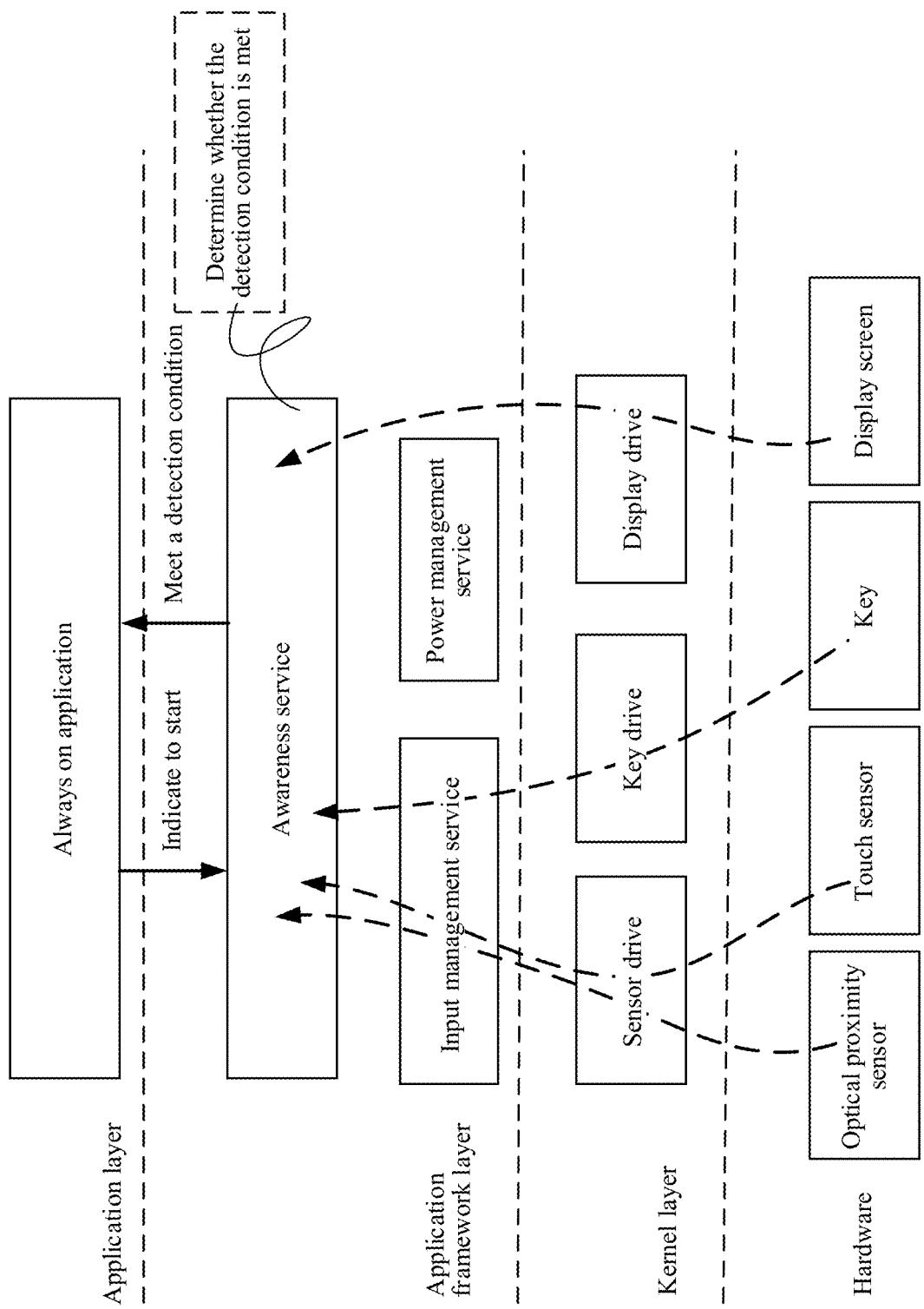
FIG. 6 is a schematic diagram of example module interaction.

FIG. 6 is a schematic diagram of example module interaction. Referring to FIG. 6, for example, the user taps the keep screen on while looking option 502. An always on application (also referred to as an intelligent always on application) receives a user operation. The always on application sends indication information to the awareness service by using an interface between the always on application and the awareness service, so as to instruct the awareness service to start a detection condition determining procedure. Optionally, "the detection condition determining procedure" in this embodiment of this application optionally refers to determining a condition about whether keep screen on while looking detection needs to be enabled. Only when all detection conditions are met, the mobile phone enables keep screen on while looking detection. If the detection condition is not met, keep screen on while looking detection is not enabled. It may be understood that the detection condition is a precondition for performing keep screen on while looking detection. Sound detection and blocking detection are similar thereto, and details are not described herein again.

For example, after the awareness service is enabled in response to the indication from the always on application, statuses of the optical proximity sensor, the touch sensor, and the key may be obtained by using the input management service. In addition, the awareness service may further obtain the status of the display screen by using the display drive. The awareness service may determine, with reference to the obtained status of each module (or component), whether the detection condition is met.

Figure 7:
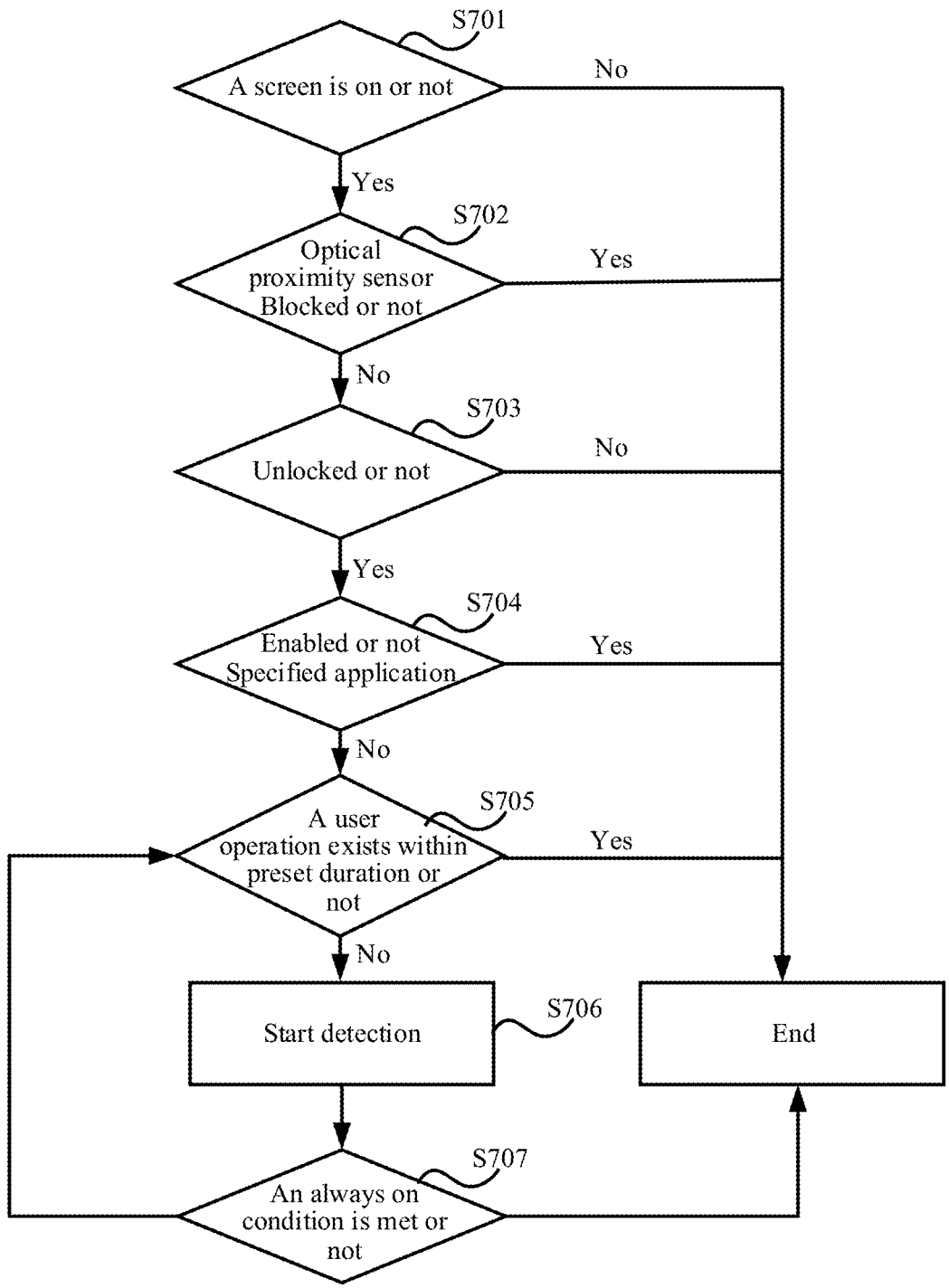
FIG. 7 is a schematic diagram of an example detection condition determining procedure.

With reference to FIG. 6, FIG. 7 shows an example detection condition determining procedure. Referring to FIG. 7, a specific procedure in which the awareness service determines whether the detection condition is met includes the following steps.

S701. The awareness service determines whether a screen is on.

For example, referring to FIG. 6, the awareness service responds to the indication from the always on application, and obtains the status of the display screen by using the display drive. Optionally, display screen states may include screen off, half screen off, and screen on, where screen on further includes screen locking and screen unlocking. For example, in the screen-off state, the mobile phone receives an operation of tapping the power key by the user, and after the mobile phone is unlocked via face unlock, the mobile phone displays the desktop. In this case, the display screen is in the screen-on state. For example, in the screen-off state, the mobile phone receives an operation of tapping the power key by the user, and when a face result is not successful, a lock screen is displayed, and in this case, the display screen is in the screen-on state. For another example, in the lock screen mode (the display screen is on), if no user operation is received within specified duration (for example, 20 s, which may be set based on an actual requirement, and this application is not limited thereto), the lock screen interface changes to the half-screen-off state, and enters the screen-off mode after no user operation is received within 3 s (which may be set based on an actual requirement, and this application is not limited thereto), that is, the display screen is off.

Referring to FIG. 6, for example, the awareness service may obtain the status of the display screen by using the display drive, so as to determine whether the status of the display screen is screen-on. In an example, if the display screen is currently in the screen-on state, S702 is performed. In another example, if the display screen is currently in the screen-off state or the half-screen-off state, it is determined that the detection condition is not met, and the current determining procedure ends.

Optionally, in this embodiment of this application, after starting, the awareness service may trigger the display drive to report the status of the display screen in real time. For example, the awareness service may send indication information to the display drive, so as to instruct the display drive to report the status of the display screen to the awareness service.

S702. The awareness service determines whether an optical proximity sensor is blocked.

For example, referring to FIG. 6, the awareness service may send indication information to the input manager, so as to instruct the input manager to obtain a status of the optical proximity sensor and a status of the touch sensor from the sensor drive, and obtain a status of the key (for example, the power key) from the key drive. The input management service responds to the indication from the awareness service, obtains the statuses of the optical proximity sensor and the touch sensor in real time by using the sensor drive, and obtains the status of the key in real time by using the key drive.

For example, if the user places the mobile phone face down on the desk or places the mobile phone in the pocket, the optical proximity sensor is blocked. After detecting the blocking, the optical proximity sensor sends a detection signal to the sensor drive. The sensor drive may determine, based on the received detection signal, that the optical proximity sensor is blocked, that is, there is a blocking event of the optical proximity sensor. The sensor drive may output the blocking event of the optical proximity sensor to the input management service. The input management service determines, in response to the received blocking event of the optical proximity sensor, that the optical proximity sensor is blocked. The input management service indicates to the awareness service that the optical proximity sensor is blocked.

For example, if the optical proximity sensor is not blocked, optionally, the optical proximity sensor may not output a detection signal, that is, when the sensor drive does not receive the detection signal sent by the optical proximity sensor, the sensor drive determines that there is no proximity light blocking event. It should be noted that, optionally, an "end" step shown in FIG. 7 is to end the current determining procedure when the awareness service determines that a condition is not met. After the current procedure ends, the awareness service performs S701 again. Details are not described in the following.

S703. The awareness service determines whether the screen is unlocked.

For example, referring to FIG. 6, the awareness service may obtain a current status of the display screen by using the display drive, and when it is determined that the display screen is on and the optical proximity sensor is not blocked, the awareness service may further obtain, by using the display drive, whether the display screen is in an unlocked state. It should be noted that, steps performed by modules in this embodiment of this application are merely examples. For example, in another embodiment, alternatively, the awareness service may obtain the display state or the unlock state of the display screen by using another module, which is not limited in this application.

In an example, if the awareness service obtains that the mobile phone is currently unlocked, for example, the mobile phone currently displays the desktop, or the mobile phone currently displays a game application (or may be another application, which is not limited in this application), S704 is performed. In another example, if the awareness service determines that the mobile phone is not unlocked, for example, the mobile phone is screen-on but is in a lock screen mode, the current determining procedure ends.

S704. The awareness service determines whether to enable a specified application.

For example, the awareness service may invoke information about a foreground application. For example, the "foreground application" may be an application that is currently running and displayed on the display screen. For example, the display interface of the mobile phone currently displays a video application and a document, and both the document and the video application are foreground applications. Certainly, in some embodiments, the "foreground application" may be an application that is running, is displayed on the display screen, and is last operated by the user. This is not limited in this application.

For example, the awareness service may determine, based on the obtained information about the foreground application, whether the foreground application is a specified application. In this embodiment of this application, when the mobile phone starts some specified applications, the mobile phone may determine that the detection condition is not met, that is, no subsequent non-screen-off detection is required. For example, if the foreground application is a voice call application, correspondingly, when the user uses a voice call, even if the screen of the mobile phone is off, the voice call application is not affected. Therefore, for the voice call application, the non-screen-off detection procedure may not be enabled. Certainly, in addition to the voice call, the specified applications may further include one or more other applications (or functions or services). For example, if the mobile phone is running a video application, and the video application is fully displayed, in this case, when the video application is fully displayed, an application lock is enabled. After the application lock is enabled, the mobile phone keeps the screen on and not locked. For another example, if the mobile phone is running a video conference application, optionally, the video conference application automatically enables the application lock after being enabled. After detecting that the video conference application is enabled, the awareness service ends the current detection procedure. It should be noted that, the specified application in this embodiment of this application is only an example. In another embodiment, the specified application may alternatively be an application that needs the screen to continuously keep on and unlocked, which is not limited in this application.

In an example, if the awareness service detects that the specified application is enabled, the current procedure ends. Optionally, after the specified application ends running, the awareness service performing the procedure starting from S701 again.

In another example, if the awareness service detects that the specified application is not enabled, S705 is performed.

It should be noted that, a determining sequence of the conditions of S702 to S704 is not limited in this embodiment of this application. For example, the awareness service may first determine whether the screen is unlocked, and then determine whether the optical proximity sensor is blocked. In this embodiment of this application, the awareness service may alternatively detect all conditions at the same time, which is not limited in this application.

S705. The awareness service determines whether a user operation exists in preset duration.

For example, referring to FIG. 6, as described above, the awareness service may determine, by using the input management service, whether a user operation exists. The user operation includes but is not limited to: touching the display screen and pressing the power key. For example, if the user taps the touchscreen, the touch sensor detects the tap operation of the user, and outputs a detection signal to the sensor drive. The sensor drive determines, in response to the received detection signal, that a touch event exists. The sensor drive outputs the touch event to the input management service. The input management service determines, based on the received touch event, that a user touch operation currently exists, and sends indication information to the awareness service, so as to indicate that a user touch operation currently exists. Correspondingly, the awareness service determines that a user touch operation exists, and the current detection procedure ends. For another example, if the user presses the power key, the key drive detects that the key is pressed, and the key drive outputs a power key pressing event to the input management service. The input management service responds to the received event, and sends indication information to the awareness service, so as to indicate that a power key pressing operation exists currently. Correspondingly, the awareness service determines that an operation of pressing the power key by the user exists, and the current detection procedure ends.

For example, the awareness service may preset user operation detection duration. As shown in FIG. 3b, in this embodiment of this application, the mobile phone may provide several sleep options, including a 15 seconds option, a 30 seconds option 306, a 1 minute option, a 5 minutes option, and a 10 minutes option. Correspondingly, corresponding user operation detection duration is also different based on different sleep duration. For example, the sleep duration is 30 seconds. The mobile phone starts from a last operation in the screen-on state. If no user operation is received within 24 s, the mobile phone enters the half-screen-off mode. In the half-screen-off mode, if no user operation is received within 6 s, the mobile phone enters the screen-off mode. It should be noted that, the duration setting in this embodiment of this application is only an example, and is not limited in this application. Details are not described in the following. For example, in a scenario in which the sleep duration is 30 s, the mobile phone performs S701 to S704, that is, when the awareness service detects that the mobile phone is in the screen-on state or the unlock state, or does not enable any specified application, and the optical proximity sensor is not blocked, the awareness service starts to monitor whether a user operation is received, and continue monitoring for 19 s. That is, when the sleep duration is 30 s, corresponding preset duration (that is, duration of detecting whether a user operation is received) is 19 s. Optionally, if within 19 s, the awareness service does not receive any user operation indicated by the input management service, the awareness service determines that no user operation is received within the preset duration, and starts a non-screen-off detection procedure, that is, performs S706. Optionally, if the awareness service detects a user operation within 19 s, the current procedure ends, and S701 is repeatedly performed. Optionally, if within 19 s, the awareness service detects that the optical proximity sensor is blocked, for example, the user places the mobile phone face down on the desktop or places the mobile phone in the pocket, the awareness service ends the current procedure, and repeatedly performs S701. It may be understood that, in a case of 30s of sleep, the awareness service starts to perform non-screen-off detection at 5s right before entering the half-screen-off state, thereby ensuring real-time detection and reducing system power consumption.

S706. The awareness service starts detection.

For example, still referring to FIG. 6, after the awareness service detects that the detection conditions are met, that is, all conditions in S701 to S705 are met, the awareness service sends indication information to the always on application, so as to indicate that the detection conditions are met. For example, in response to the received indication information sent by the awareness service, the always on application determines that all the detection conditions are met, and may start to perform non-screen-off detection. The always on application may send indication information to the awareness service, so as to instruct to start non-screen-off detection. Optionally, the always on application may indicate, to the awareness service based on a selection of the user, which type of non-screen-off detection is specifically to be enabled. It should be noted that, for different detection types, detection conditions corresponding to the detection types may be the same, or may be different. For example, if the selection of the user in FIG. 5*b* includes the keep screen on while looking option, the always on application sends indication information to the awareness service, so as to instruct the awareness service to enable keep screen on while looking detection. If the selection of the user in FIG. 5*b* includes the keep screen on while sounding option, the always on application sends indication information to the awareness service, so as to instruct the awareness service to enable keep screen on while sounding detection. Examples are not described herein one by one.

S707. The awareness service determines whether an always on condition is met.

Figure 8:
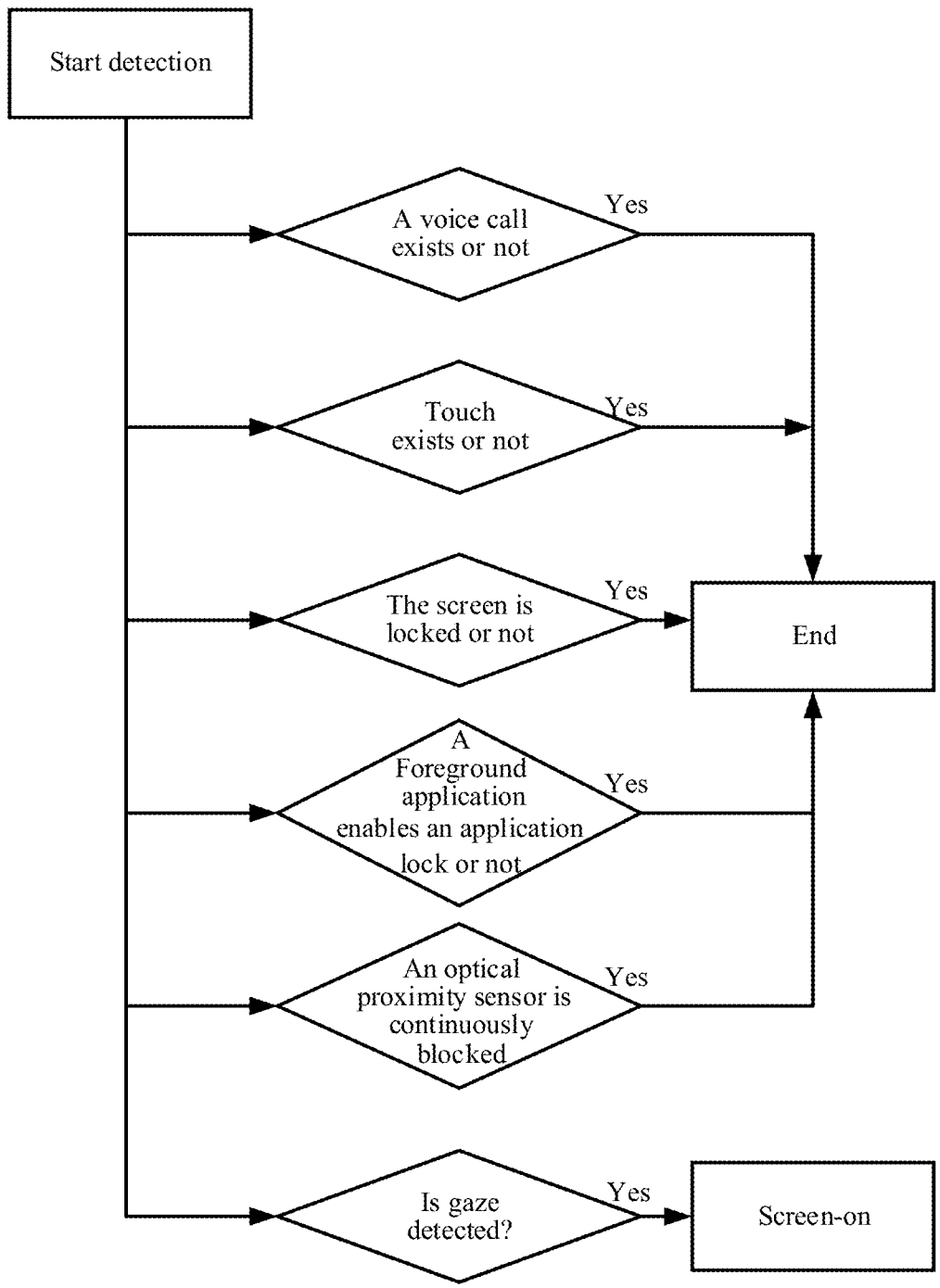
FIG. 8 is a schematic flowchart of an example keep screen on while looking screen detection process.

As described above, always on conditions corresponding to different non-screen-off detection may be different. The following uses a keep screen on while looking scenario as an example for description. Referring to FIG. 8, for example, after performing non-screen-off detection in response to an indication from the always on application, the awareness service performs detection based on a plurality of conditions corresponding to the keep screen on while looking function. The keep screen on while looking condition includes but is not limited to at least one of the following:

1) during detection, no voice call is running;
2) during detection, no touch operation is detected;
3) during detection, no lock screen operation is detected;
4) during detection, a foreground application does not enable an application lock;
5) during detection, the optical proximity sensor is not continuously blocked; and
6) during detection, looking is detected.

It should be noted that, in this embodiment of this application, the foregoing conditions are only used as examples for description. In another embodiment, more or fewer conditions may be included, which is not limited in this application.

It should be further noted that, detection duration may be set for the awareness service. In this embodiment of this application, detection duration corresponding to different sleep duration may be the same or different. For example, if the sleep duration is 15 s, corresponding detection duration is optionally 7 s. If the sleep duration is 30 s, the corresponding detection duration may be optionally 11 s. If the sleep duration is 1 minute, 2 minutes, 5 minutes, or 10 minutes, the corresponding detection duration may be 11 s. The foregoing values are only examples, and may be set based on an actual requirement, which is not limited in this application.

For example, in this embodiment of this application, the awareness service performs detection based on the foregoing conditions. When any condition in the conditions 1) to 5) is not met, the current detection procedure ends, and S701 is repeatedly performed. When the condition 6) is met, that is, the awareness service determines that there is looking, the awareness module notifies the always on application that the keep screen on while looking condition is met, and the always on application may control the mobile phone to turn on the screen.

In a possible implementation, the keep screen on while sounding condition includes but is not limited to at least one of the following:

1) during detection, no voice call is running;
2) during detection, no touch operation is detected;
3) during detection, no lock screen operation is detected;
4) during detection, a foreground application does not enable an application lock;
5) during detection, the optical proximity sensor is not continuously blocked; and
6) during detection, a specified sound is detected.

For example, for description of the conditions 1) to 5), refer to the foregoing description. Details are not described herein again. Optionally, the specified sound may be a voice instruction with specified content, for example, the user speaks "screen on" to the mobile phone, and the mobile phone may keep the screen-on state in response to the detected voice.

In another possible implementation, the keep screen on while blocking condition includes but is not limited to at least one of the following:

1) during detection, no voice call is running;
2) during detection, no touch operation is detected;
3) during detection, no lock screen operation is detected;
4) during detection, a foreground application does not enable an application lock;
5) during detection, the optical proximity sensor is not continuously blocked; and
6) during detection, the optical proximity sensor is blocked for a specified quantity of times.

For example, for description of the conditions 1) to 5), refer to the foregoing description. Details are not described herein again. For example, that the optical proximity sensor is blocked for a specified quantity of times may be optionally that the optical proximity sensor is blocked for one or more times, and duration of each time of blocking is less than a specified threshold (for example, Is). For example, the user may wave the palm in front of the display screen. In a waving process, the optical proximity sensor is blocked for a plurality of times, and duration of each time of blocking is less than the specified threshold. Then, a requirement of the condition 6) is met. It should be noted that, in this embodiment of this application, keep screen on while looking detection is used as an example for description. For implementations of keep screen on while sounding and keep screen on while blocking scenarios, references may be made to specific content of keep screen on while looking detection. Details are not described by using examples one by one in this application.

Figure 9:
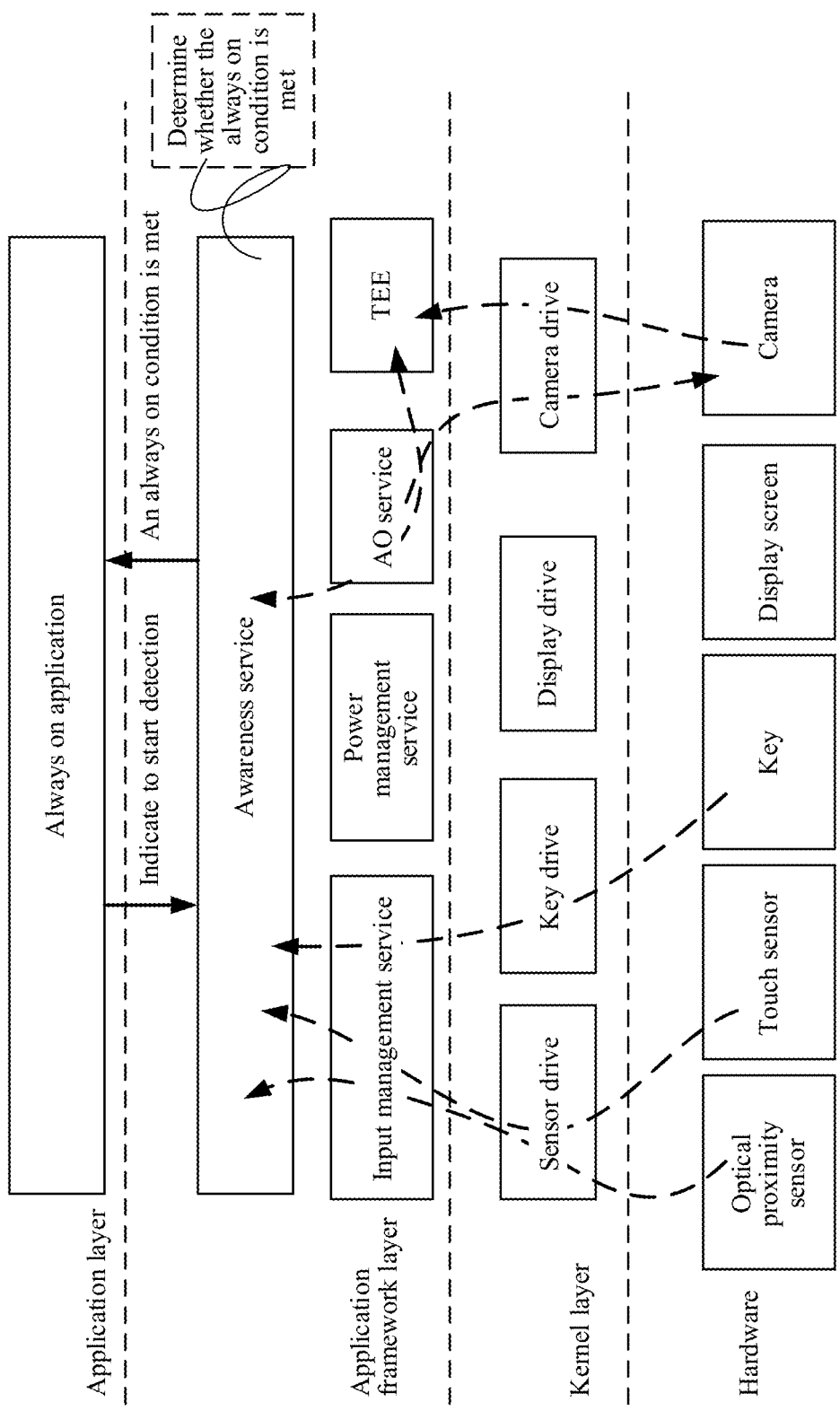
FIG. 9 is a schematic diagram of example module interaction.

The following is described by using an example of keep screen on while looking condition detection. With reference to FIG. 8, FIG. 9 is a schematic diagram of example module interaction. Referring to FIG. 9, for example, the awareness service starts to perform keep screen on while looking condition detection in response to an indication from the always on application. The awareness service may obtain the statuses of the optical proximity sensor, the touch sensor, and the power key by using the input management service, so as to determine whether a user operation exists. For specific description, refer to the foregoing, and details are not described herein again.

In an example, if the awareness service detects, based on information input by the input management service, that an operation such as a touch operation or a lock screen operation exists, or detects that the optical proximity sensor is continuously blocked, the awareness service determines that the keep screen on while looking condition is not met, and performs S701 again. For example, if the user places the mobile phone face down on the desktop during detection, so that the optical proximity sensor is blocked, after detecting that the optical proximity sensor is blocked continuously (for example, more than 3 s, which may be set based on an actual requirement and is not limited in this application), the awareness module stops keep screen on while looking condition detection, and performs S701 again. For example, if the awareness service detects that the user presses the power key or touches the screen during detection, the awareness service stops keep screen on while looking condition detection, and performs S701 again.

In another example, the awareness service may monitor whether a voice application is enabled, and the awareness service may monitor whether a foreground application enables an application lock. For specific description, refer to the foregoing description. Details are not described herein again.

Continue to refer to FIG. 9. For example, the awareness service determines that all the foregoing conditions 1) to 5) are met during detection. The awareness service responds to received information indicating that the always on application indicates to start detection, and the awareness service starts detection. During detection, the awareness service instructs the AO service to perform looking detection while continuously detecting whether the conditions 1) to condition 5) are met. In response to the indication from the awareness service, the AO service instructs the camera drive to enable the camera, and outputs an image collected by the camera to the TEE. In response to the indication from the AO service, the camera drive obtains the image collected by the camera from the camera, and outputs the collected image to the TEE.

Figure 10:
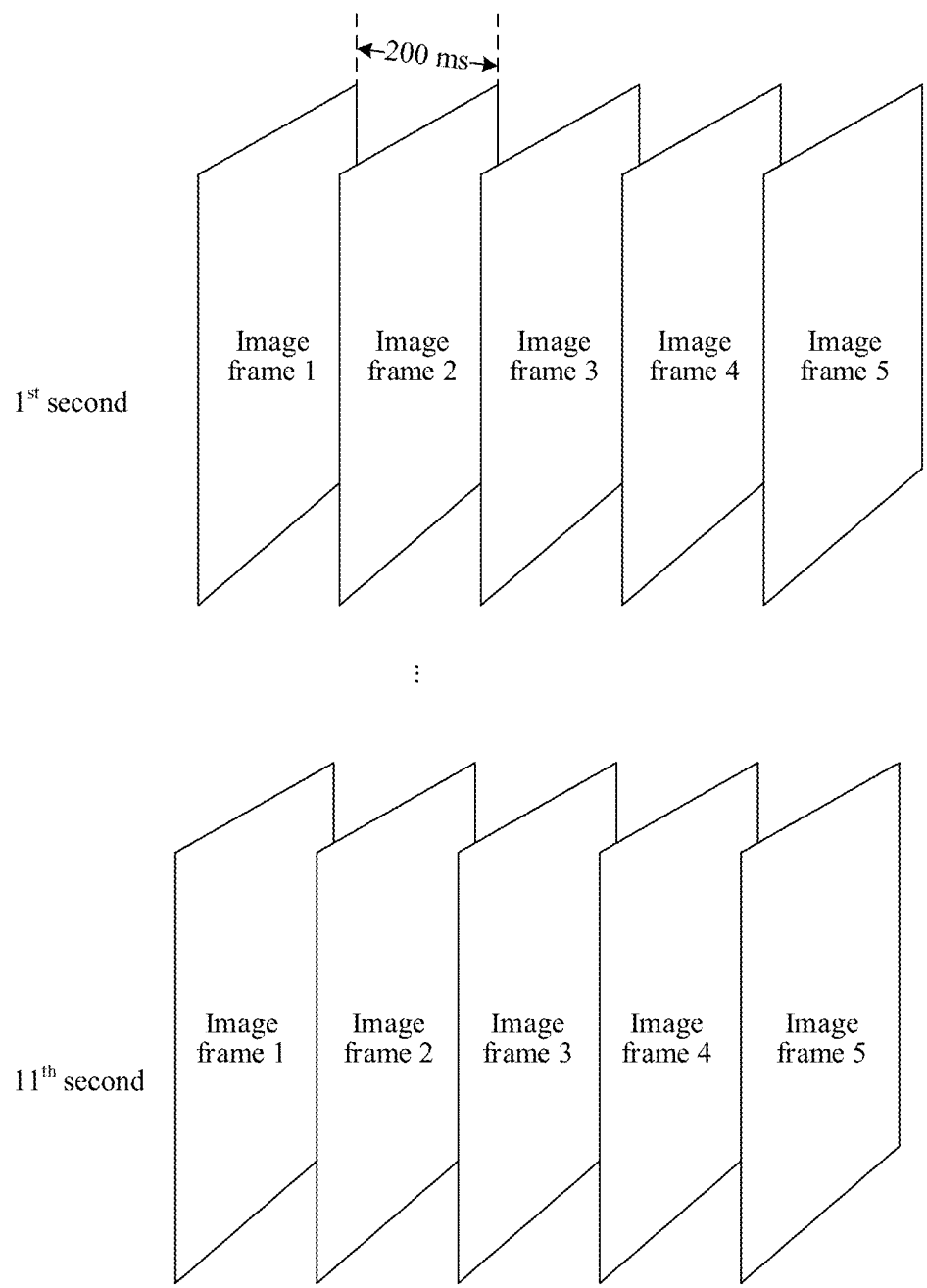
FIG. 10 is a schematic diagram of example image frame collection.

Referring to FIG. 10, for example, detection duration of 11 s is still used as an example. In this embodiment of this application, the camera drive may output an image frame to the TEE at a frame rate of 5 fps (that is, a quantity of image frames collected per second), thereby ensuring time efficiency and reducing occupation of the TEE. Optionally, 5 fps means that the camera outputs five image frames to the TEE per second. The value is only an example, and is not limited in this application.

Still referring to FIG. 10, for example, in this embodiment of this application, the frame rate of the camera is optionally 60 fps, that is, a quantity of image frames collected per second is optionally 60. The camera drive may obtain one image frame from the camera at an interval of 200 ms, and output the image frame to the TEE for 11 s (that is, detection duration). Optionally, in other embodiments, the camera drive may alternatively control a frame rate for collection by the camera. For example, the camera may collect an image based on the frame rate of 5 fps, that is, collect an image frame at an interval of 200 ms, and output the image frame to the camera drive. The frame rate is only an example, and this application sets no limitation thereto.

Still referring to FIG. 9, for example, the TEE obtains, from the camera drive, the image frame collected by the camera. For example, the TEE may obtain five image frames every 1 second from the camera drive. The AO service may recognize an image in the TEE based on a preset detection algorithm (also referred to as a recognition algorithm).

Figure 11:
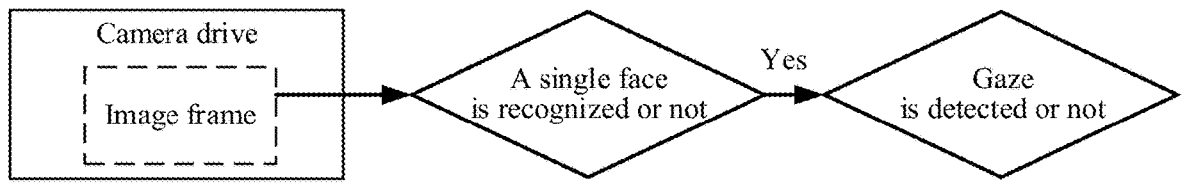
FIG. 11 is a schematic diagram of an example recognition process.

FIG. 11 is a schematic diagram of an example recognition process. Referring to FIG. 11, for example, the camera drive outputs an image frame to the TEE. The AO service recognizes the image frame in the TEE based on a face detection algorithm, so as to detect whether the image frame includes a single face. Optionally, if the image frame does not include a face or includes a plurality of faces, the AO service determines that recognition of the image frame fails, and continues to process a next image frame. Optionally, in this embodiment of this application, after recognizing an image frame, the AO service deletes the recognized image frame from the TEE. Optionally, the AO service may delete five recognized image frames after each time of recognition of the five image frames (or another quantity, which is not limited in this application), thereby reducing occupation of the TEE and further improving security of privacy of the user.

For example, if the AO service detects that the image frame includes a single face, the AO service recognizes, based on a looking detection algorithm, whether a human eye in the single face is looking. For example, it is assumed that the user is facing the mobile phone, but the user's gaze is focused elsewhere, not on the mobile phone. Correspondingly, the image collected by the camera includes the face of the user. The AO service recognizes a single face based on the face detection algorithm. In a looking detection process, if the AO service recognizes that the user does not look at the mobile phone, it is determined that recognition fails this time, and processing continues to be performed on a next image frame. For example, if the user is facing the mobile phone, and the user is looking at the display screen, correspondingly, the image collected by the camera includes the face of the user. The AO service recognizes a single face based on the face detection algorithm, and in the looking detection process, the AO service recognizes that the user is looking at the mobile phone, and determines that looking detection succeeds. It should be noted that, for specific details of the algorithm, refer to the conventional technology. Details are not described in this application.

Still referring to FIG. 9, for example, when the AO service determines that the looking detection succeeds, and the foregoing conditions 1) to 5) are met, the AO service determines that the keep screen on while looking condition is met. The AO service sends indication information to the always on application, so as to indicate that the keep screen on while looking condition is met.

Figure 12:
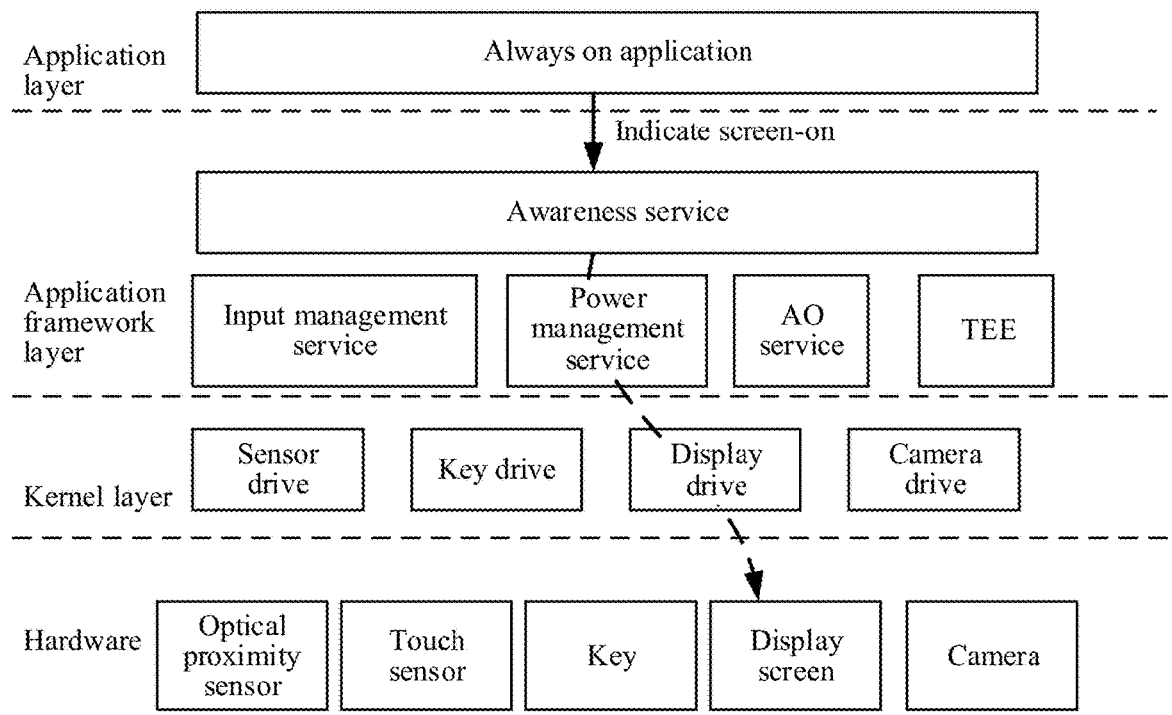
FIG. 12 is a schematic diagram of example module interaction.

Referring to FIG. 12, for example, the always on application determines, in response to the received indication information from the awareness service, that the keep screen on while looking condition is met. The always on application sends indication information to the awareness service, so as to indicate that the screen is on. In response to the received indication information, the awareness service sends the indication information to the power management service by using the interface provided by the power management service, so as to instruct to control the display screen to turn on. In response to the indication from the awareness service, the power management service controls, by using the display drive, the screen to turn on. In this embodiment of this application, the "display screen is on" is optionally that the display screen is currently in the screen-on state, and the display screen is controlled to continue to be in the screen-on state. Alternatively, the display screen is currently in the half-screen-off state, and the display screen is controlled to enter the screen-on state. A specific example is described in detail in the following embodiments.

For example, after controlling the display screen to turn on, the awareness service repeatedly performs S705, that is, continues to monitor whether there is a user operation within the preset duration, and continues to perform the keep screen on while looking detection procedure after detecting that there is no operation within the preset duration. For example, if the awareness service determines that the keep screen on while looking condition is not met, the current procedure ends, and the awareness service repeatedly performs S701.

Figure 13:
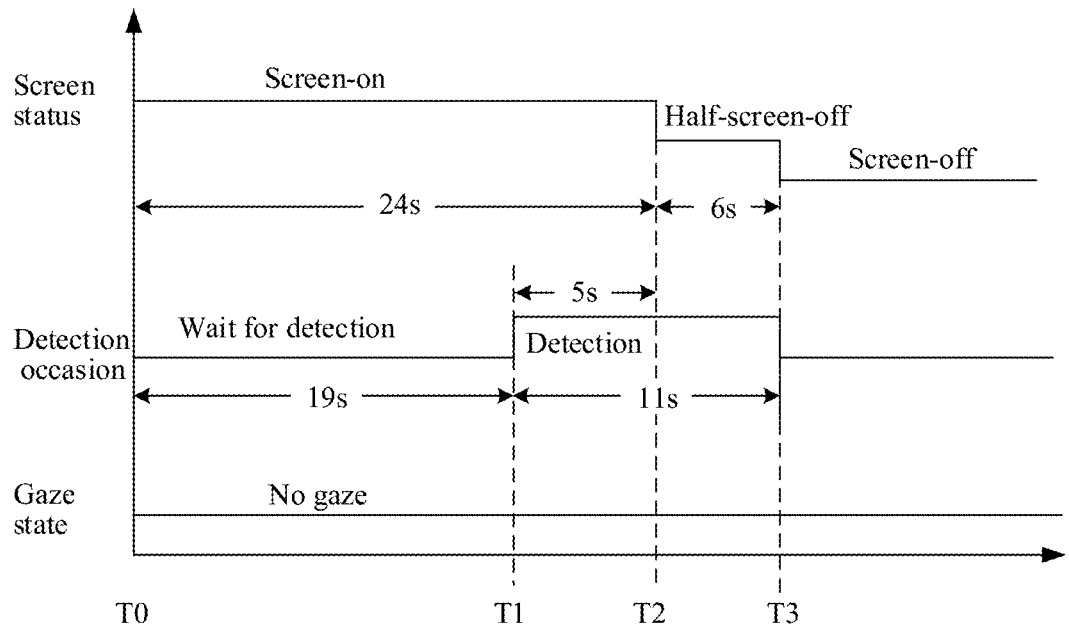
FIG. 13 is a schematic diagram of example non-screen-off detection.

With reference to a specific example, the following describes in detail a non-screen-off solution in an embodiment of this application. For example, the user still chooses to enable the keep screen on while looking function for description. FIG. 13 is a schematic diagram of example non-screen-off detection. Referring to FIG. 13, for example, at a moment TO, the mobile phone enters the desktop from the lock screen mode (or the screen-off mode) in response to a received unlock operation of the user. This scenario is only an example. A scenario in which the mobile phone enters the screen-on state may be that the mobile phone enters the desktop after exiting from another application. Alternatively, the user is always using the mobile phone. Starting from the moment TO, the mobile phone is in the screen-on state, and no user operation is performed.

For example, at the moment TO, the awareness module performs S701 to S704, and after all S701 to S704 are met, the awareness module continues to perform S705, that is, detects, within the preset duration (for example, 19 s), whether a user operation is received. For a specific detection process, refer to related content in FIG. 6 and FIG. 7, and details are not described herein again. In this example, an example in which the awareness service does not detect a user operation within 19 s is used for description.

At a moment T1, with reference to FIG. 9, the awareness service starts to perform keep screen on while looking detection in response to an indication from the always on application. It may also be understood that the awareness service enables a detection window; and in the detection window, detects whether the keep screen on while looking condition is met. Optionally, for example, the sleep duration is 30 s, a time difference between a start edge (or a rising edge, that is, the moment T1) of the detection window and a start moment (that is, a moment T2) of the half-screen-off mode is 5 s, and duration of the detection window is 11 s, that is, an end edge (that is, a falling edge, that is, a moment T3) of the detection window is the same as an end moment of the half-screen-off mode. For a specific detection process, refer to related content in FIG. 9 to FIG. 11, and details are not described herein again. That is, the awareness service may start detection 5 s before the mobile phone enters the half-screen-off state, and continuously perform detection when the mobile phone in the half-screen-off state. It should be noted that, each moment and duration are merely used as examples in this embodiment of this application, and are not limited in this application. Details are not described in the following.

For example, in the scenario in FIG. 13, the user does not look at the mobile phone always. Correspondingly, when the awareness service does not detect user gaze during detection (that is, within 11 s), it is determined that the keep screen on while looking condition is not met. Optionally, referring to FIG. 9, for example, the awareness service may send indication information to the AO service to instruct the AO service to stop looking detection. In response to the indication from the awareness service, the AO service instructs, by using the camera drive, the camera to stop collecting images. Certainly, if the camera drive and the camera are being invoked by another application, the camera drive and the camera may continue to work, and the camera drive stops transmitting an image frame to the TEE.

Still referring to FIG. 13, for example, the mobile phone maintains 6 s in the half-screen-off state, and enters the screen-off mode, that is, displays a screen-off interface. After the current detection procedure of the awareness service ends, S701 is re-performed, that is, the foregoing step is repeatedly performed after the screen of the mobile phones turns on again.

Figure 14:
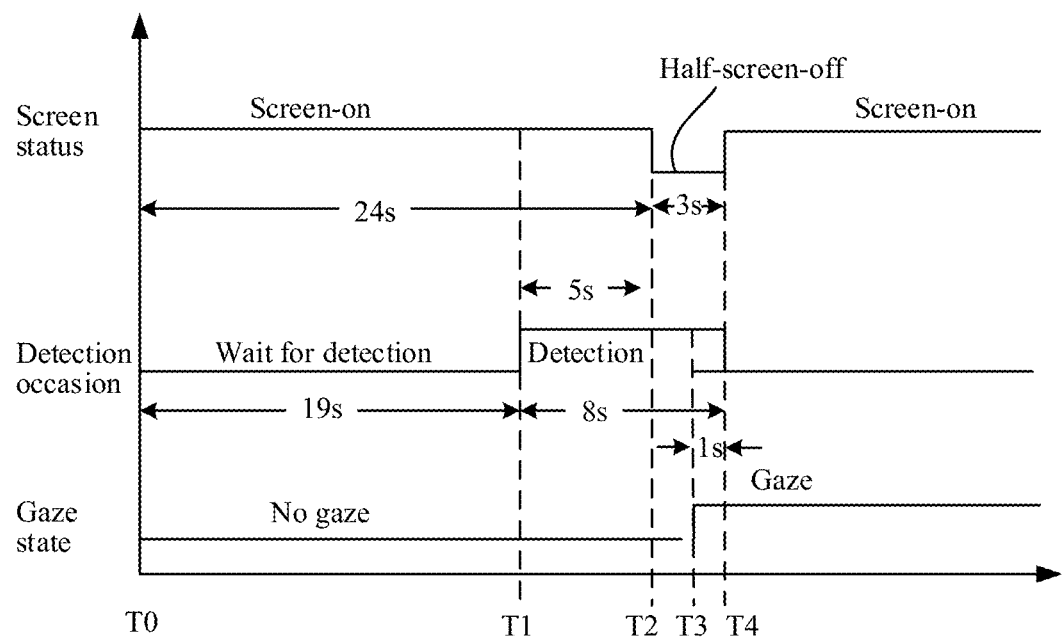
FIG. 14 is a schematic flowchart of example keep screen on while looking screen detection.
Figure 15A:
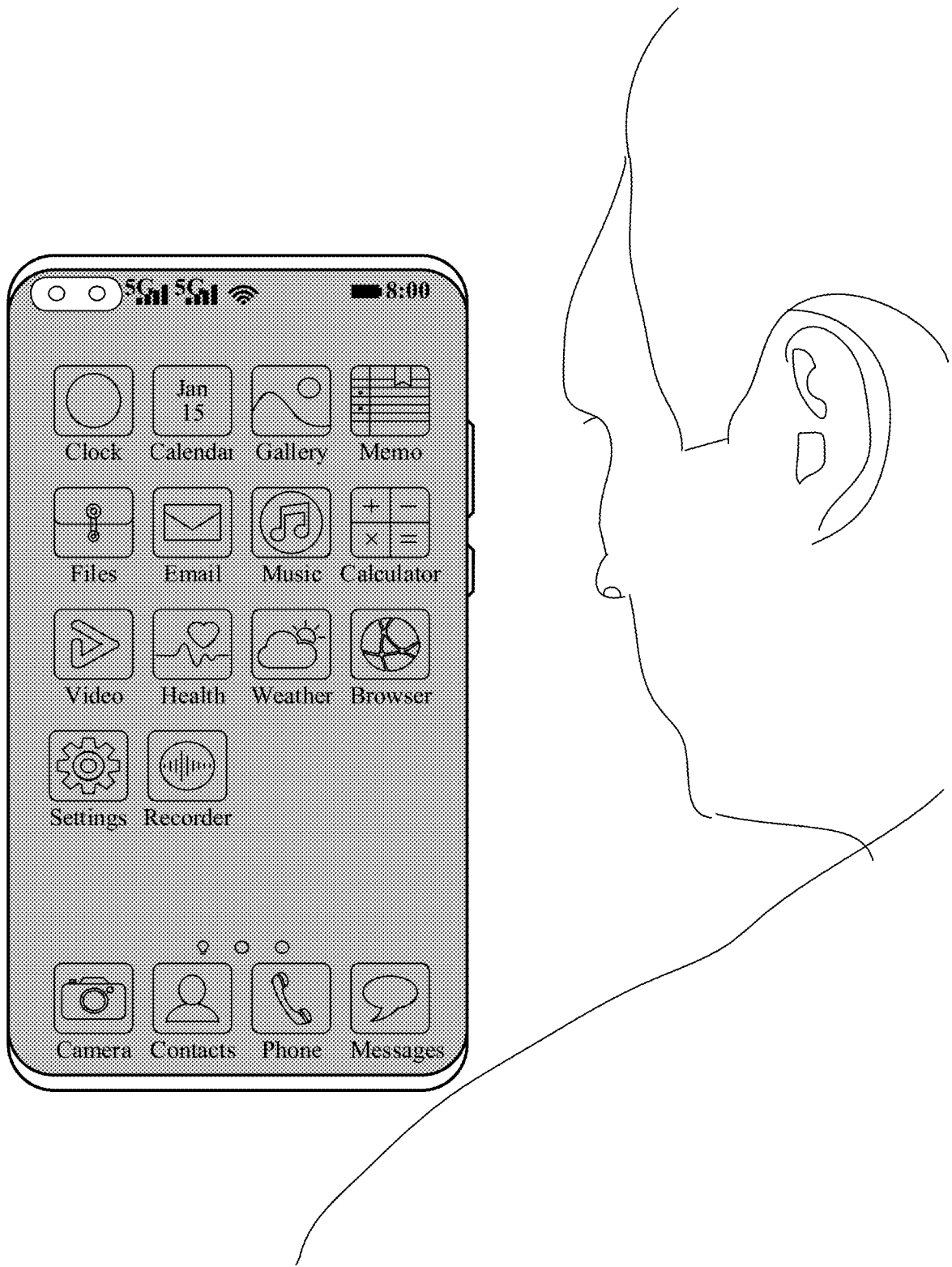
FIG. 15A is a schematic diagram of an example application scenario.

FIG. 14 is another schematic diagram of example non-screen-off detection. Referring to FIG. 14, for example, for description of the moments T0 to T2, refer to the foregoing description. Details are not described herein again. At a moment T3, the user is facing the mobile phone and looking at the display screen of the mobile phone. In this case, the mobile phone is in the half-screen-off state, as shown in FIG. 15A.

Figure 16:
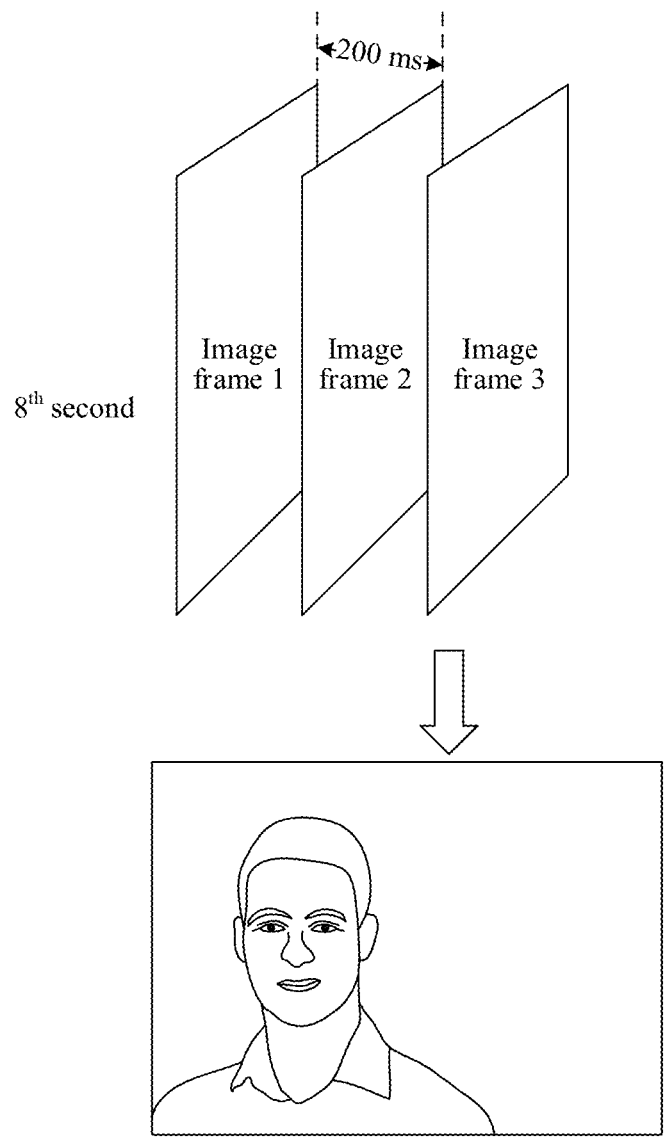
FIG. 16 is a schematic diagram of an example recognition process.

With reference to FIG. 9, for example, the camera drive outputs the image frame collected by the camera to the TEE. Referring to FIG. 16, for example, at the moment T3, it may be understood that an image frame 3 collected by the camera includes the face image of the user at the 8th second after the current detection window starts. Still referring to FIG. 9, for example, in a process of detecting the image frame 3, the AO service determines that the image frame 3 includes a single face, and determines, based on the looking detection algorithm, that there is a user gaze. The AO service may indicate to the awareness service that there is a user gaze. In response to the indication from the AO service, the awareness service sends the indication information to the always on service, so as to indicate that the always on condition is met. The always on application responds to the indication from the awareness service, and determines that the keep screen on while looking condition is met. Correspondingly, the always on application may instruct the awareness service to control the display screen to turn on. For a specific interaction process of each module, refer to related description in FIG. 12. Details are not described herein again. As shown in FIG. 15B(1) and FIG. 15B(2), for example, at a moment T4, the display screen of the mobile phone enters the screen-on state from the half-screen-off state. It should be noted that, in this embodiment of this application, a delay (including a camera collection delay and an algorithm delay) is merely used as an example. Optionally, the algorithm delay may be at a millisecond level. For example, the user looks at the screen at the moment T3, and the camera starts to collect the image frame 3 at an interval of 200 ms (or may be less than 200 ms) after T3, where the image frame 3 includes the image of the user. The AO service recognizes the image frame 3 and recognizes a human eye, and the awareness service controls, based on a recognition result of the AO service, the display screen to turn on at the moment T4. Optionally, an interval between the moment T3 and the moment T4 may be at a millisecond level. The delay shown in the accompanying drawing of this embodiment of this application is only an example distance, and is not limited in this application.

For example, the user looks at the display screen at the moment T3. However, because of a delay, for example, from camera collection and algorithm, the display screen is on at the moment T4 (1s apart from the moment T3).

Figure 17:
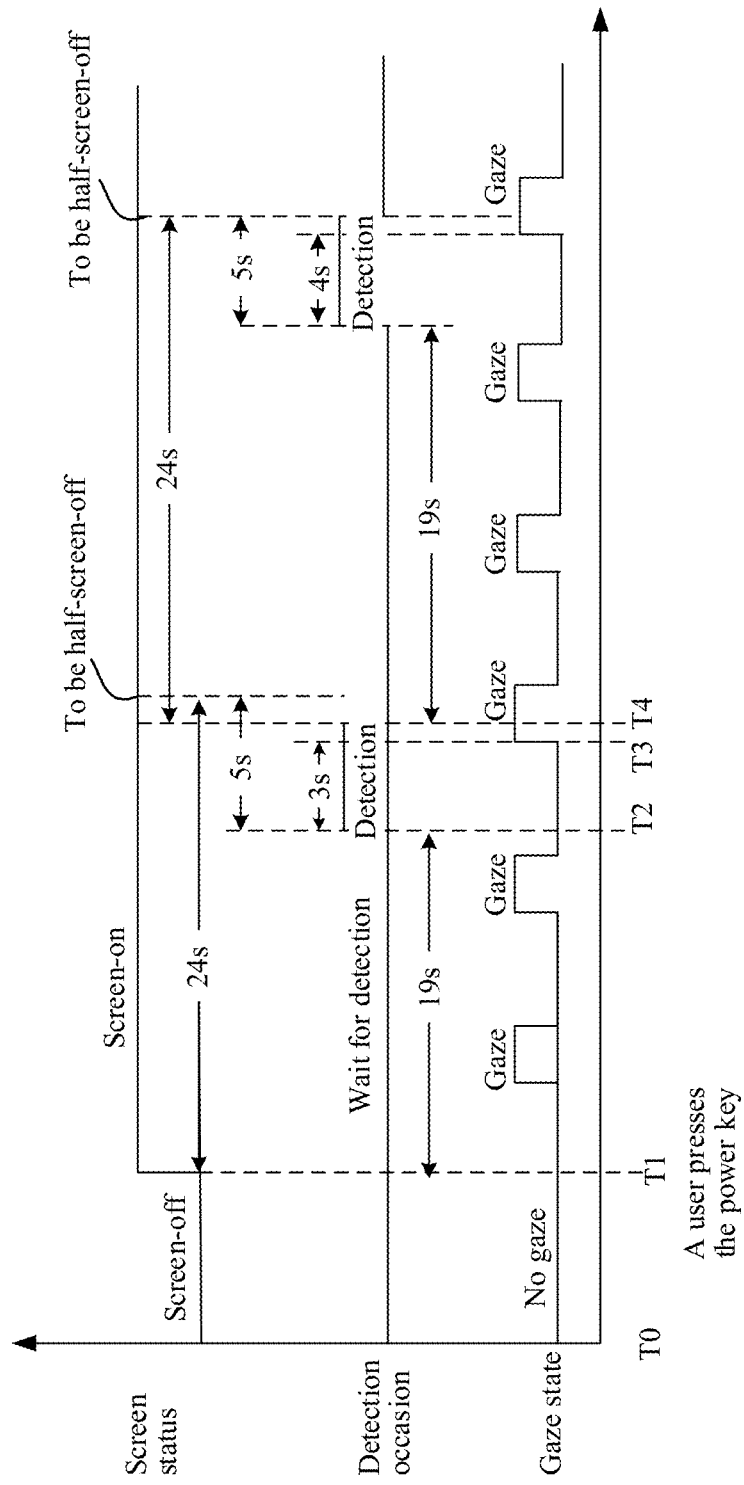
FIG. 17 is a schematic diagram of example non-screen-off detection.
Figure 18:
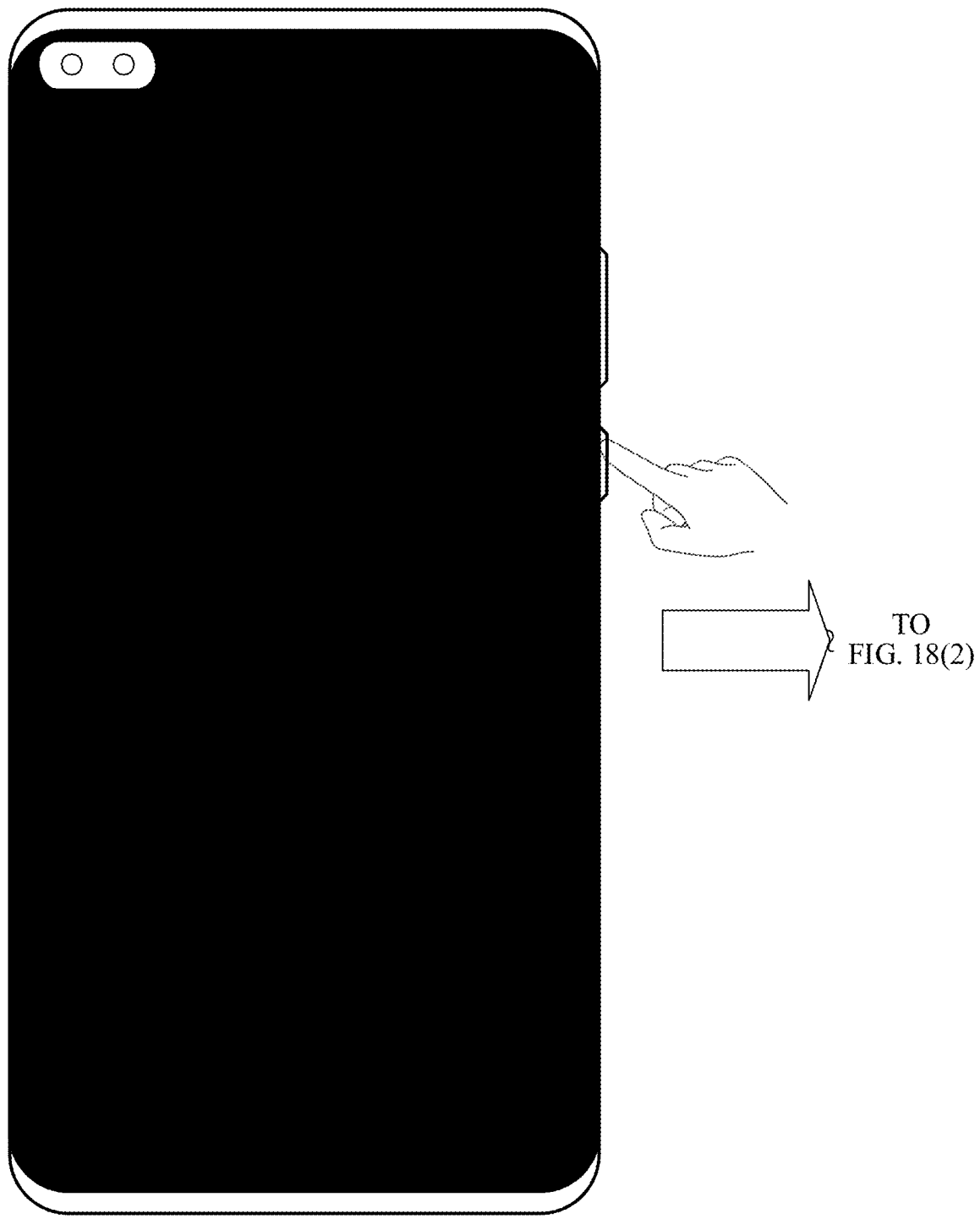
FIG. 18(1) and FIG. 18(2) are a schematic diagram of an example state of a display screen of an electronic device.
Figure 18:
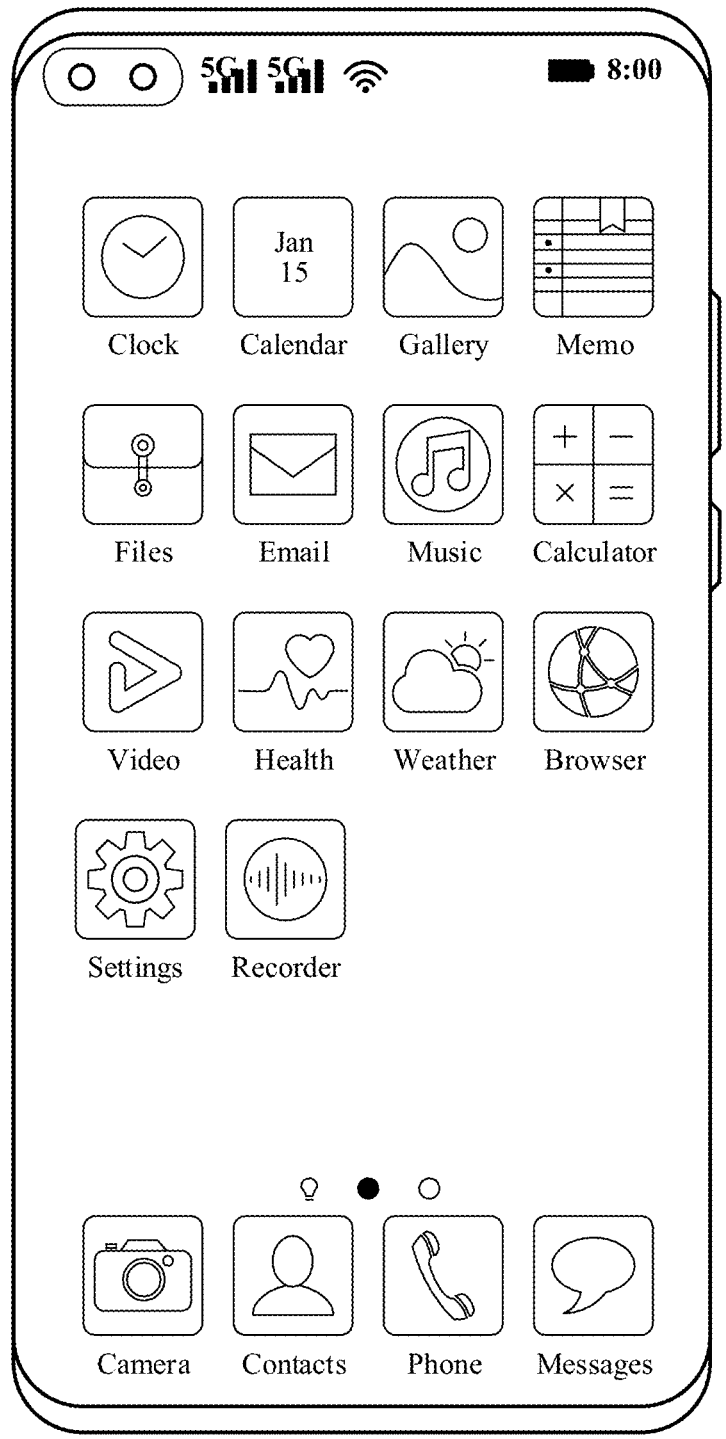

FIG. 17 is another schematic diagram of example non-screen-off detection. For example, in this scenario, the user intermittently looks at the screen of the mobile phone. It should be noted that, as shown in FIG. 17, duration and time that the user looks at the screen are merely examples, and are not limited in this application. Referring to FIG. 17, for example, the screen of the mobile phone is in the screen-off mode starting from the moment T0. Certainly, the mobile phone may be in the screen-off mode before the moment T0, or at the moment T0, the user presses the power key, so that the mobile phone enters the screen-off mode, which is not limited in this application. At the moment T1, as shown in FIG. 18(1), the user presses the power key. As shown in FIG. 18(2), the mobile phone displays the desktop after face unlock in response to a received user operation. In this case, the mobile phone is in the screen-on state.

Still referring to FIG. 17, for example, at the moments T0 to T1, the awareness service performs detection according to the procedure shown in FIG. 6 and FIG. 7, where because the mobile phone is always in the screen-off state at the moments T0 to T1, the awareness service determines that the detection condition is not met, and repeatedly performs S701. For example, when the mobile phone is in the screen-off mode, that is, when the display screen is in the screen-off state, the user taps the power key, and the mobile phone performs face recognition on the user to unlock. At the moment T1, the mobile phone is successfully unlocked and the desktop is displayed. It should be noted that, a manner from the screen-off mode to the desktop mode of the mobile phone, or a manner from the screen-off state to the screen-on state in this embodiment of this application may be understood as only an example. For example, in another embodiment, the user may further change the mobile phone from the screen-off state to the screen-on state (indicating an unlocked screen-on state) in a manner such as sliding to unlock. The status of the display screen obtained by the awareness service from the display drive is the screen-on state, and the mobile phone is in an unlocked state (that is, a desktop mode). The optical proximity sensor of the mobile phone is not blocked, and an application with an application lock is not running. That is, conditions in S701 to S704 are met, and the awareness service continuously monitors the screen for 19 s starting from the moment T1, so as to monitor whether a user operation exists within 19 s. In this embodiment of this application, an example in which a user operation is not monitored is used for description. That is, the awareness service determines that the detection condition is met, and the awareness service sends indication information to the always on application at the moment T2, so as to indicate that the detection condition is met. The always on application sends indication information to the awareness service in response to the indication from the awareness service, so as to instruct the awareness service to perform subsequent keep screen on while looking detection. The awareness service enables a detection window in response to the indication from the always on application. As shown in FIG. 17, at the moment T2, the awareness service starts to perform detection, so as to enable the detection window. For description of the detection window; refer to the foregoing description. Details are not described herein again. It should be noted that, at the moments T1 to T2, although the user intermittently looks at the display screen, because the awareness service does not start the detection window at the moments T1 to T2, the awareness service cannot obtain a gaze status of the user.

For example, at the moments T2 to T3, the user does not look at the display screen. Correspondingly, the awareness module cannot detect user gaze. For a specific detection process, refer to the description in FIG. 8 and FIG. 9, and details are not described herein again. For example, at the moment T3 (an interval between the moment T3 and the moment T2 is 3 s), the user looks at the display screen. The awareness service detects a user gaze and determines that the keep screen on while looking condition is met, and the awareness service notifies the always on application. At the moment T4 (an interval between the moment T4 and the moment T3 is 1s), the awareness service responds to the indication from the always on application, and controls, by using the power management module, the display screen to turn on. It may be understood that if at the moment T4, the awareness service does not detect a user gaze, the display screen enters the half-screen-off state after screen-on duration reaches 24 s. At the moment T4, because a user gaze is detected, the display screen keeps the screen-on state, and duration of the screen-on state is timed again (duration is 24 s). That is, if no user gaze or user operation or the like is detected after next 24 s (counting from the moment T4), the display screen enters the half-screen-off state.

Continue to refer to FIG. 17. For example, at the moment T4, the display screen performs screen-on timing again, and timing duration is 24 s. The awareness service starts from S705, that is, starts from the moment T4, and detects again whether there is a user operation within 19 s. For example, in a next detection window, the awareness service detects a user gaze at the 4th second after the detection window is enabled, and at the 5th second, which may be understood as before the display screen is about to be half off, controls the display screen to continue to keep in the screen-on state. For specific description, refer to the foregoing description. Details are not described herein again.

Figure 19:
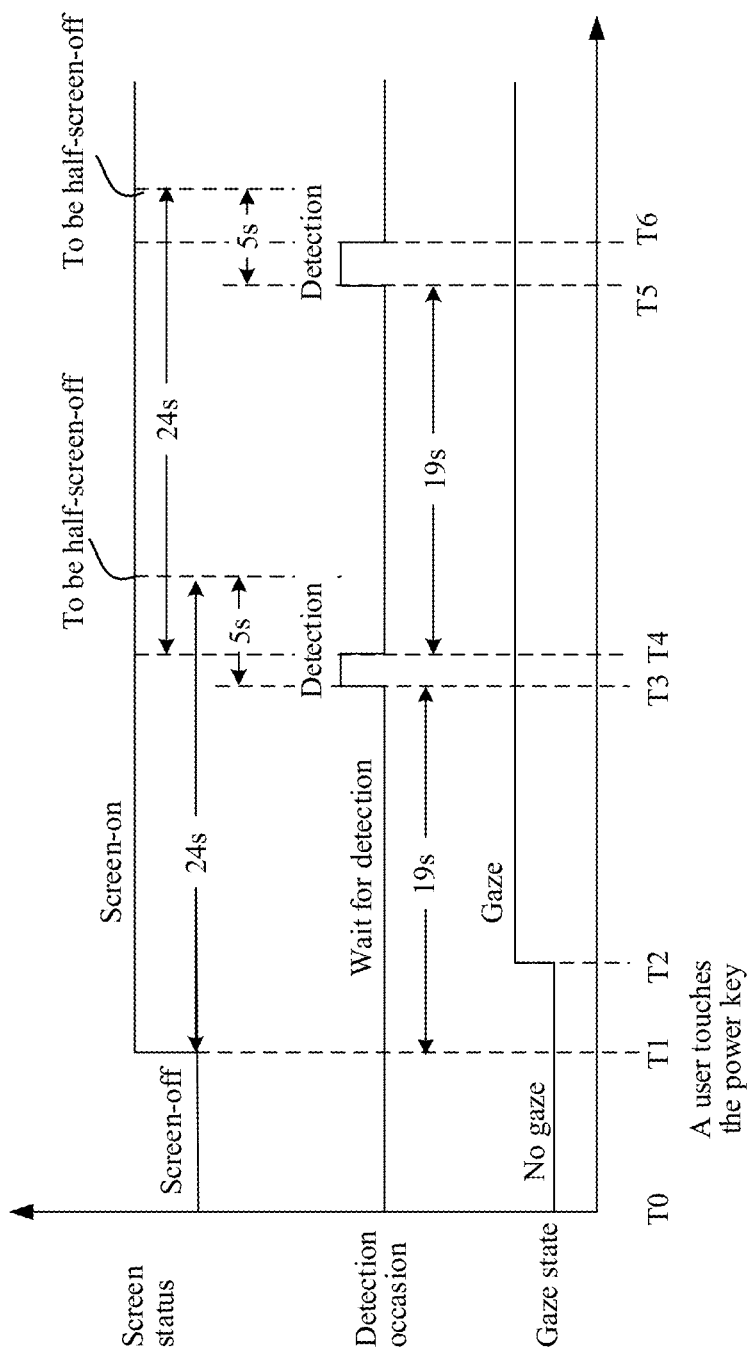
FIG. 19 is a schematic diagram of example non-screen-off detection.

FIG. 19 is another schematic diagram of example non-screen-off detection. For example, in this scenario, the user intermittently looks at the screen of the mobile phone. It should be noted that, as shown in FIG. 19, duration and time that the user looks at the screen are merely examples, and are not limited in this application. Referring to FIG. 19, for example, the screen of the mobile phone is in the screen-off mode starting from the moment T0. Certainly, the mobile phone may be in the screen-off mode before the moment T0, or at the moment T0, the user presses the power key, so that the mobile phone enters the screen-off mode, which is not limited in this application. At the moment T1, as shown in FIG. 18(1), the user presses the power key. As shown in FIG. 18(2), the mobile phone displays the desktop after face unlock in response to a received user operation. In this case, the mobile phone is in the screen-on state.

Still referring to FIG. 19, for example, at the moments T0 to T1, the awareness service performs detection according to the procedure shown in FIG. 6 and FIG. 7, and for specific description, refer to related content in FIG. 17. Details are not described herein again. For example, as shown in FIG. 19, in this embodiment, the user continuously looks at the display screen of the mobile phone starting from the moment T2.

At the moment T3, the awareness service starts to perform keep screen on while looking detection to enable a detection window. For description of the detection window, refer to the foregoing description. Details are not described herein again. It should be noted that, at the moments T2 to T3, although the user continuously looks at the display screen, because the awareness service does not start the detection window at the moments T2 to T3, the awareness service cannot obtain a gaze status of the user.

As shown in FIG. 19, in this embodiment, the user continuously looks at the display screen. Therefore, after enabling the detection window; the awareness service can detect user gaze. At the moment T4, the awareness service may control the display screen to keep on. Optionally, as described above, the time difference between the moments T3 and T4 is optionally an algorithm delay, for example, may be Is, or certainly may be a smaller or larger value, which is not limited in this application.

For example, the display screen counts 24 s again starting from the moment T4. In addition, the awareness service repeatedly performs S705 starting from the moment T4, that is, continues to monitor whether a user operation is received within 19 s. For a specific process, refer to the foregoing description. Details are not described herein again. For example, at a moment T5, the awareness service starts keep screen on while looking detection again. At a moment T6, after detecting a user gaze, the awareness service controls the display screen to keep in the screen-on state.

Figure 20:
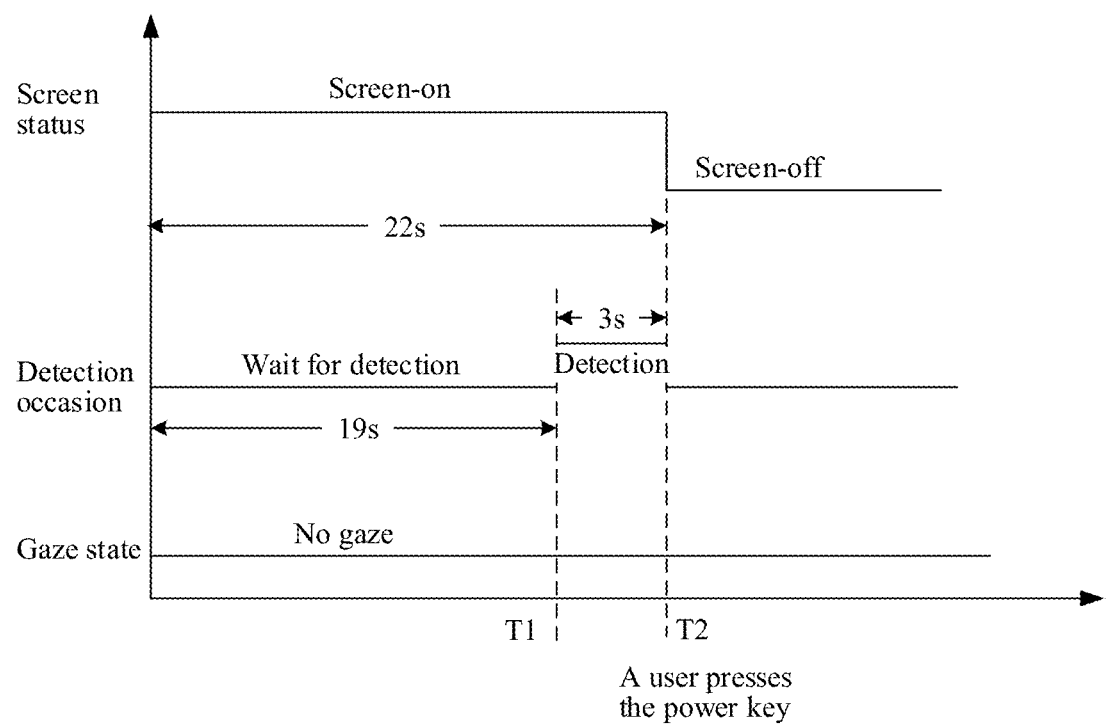
FIG. 20 is a schematic diagram of example non-screen-off detection.
Figure 21:
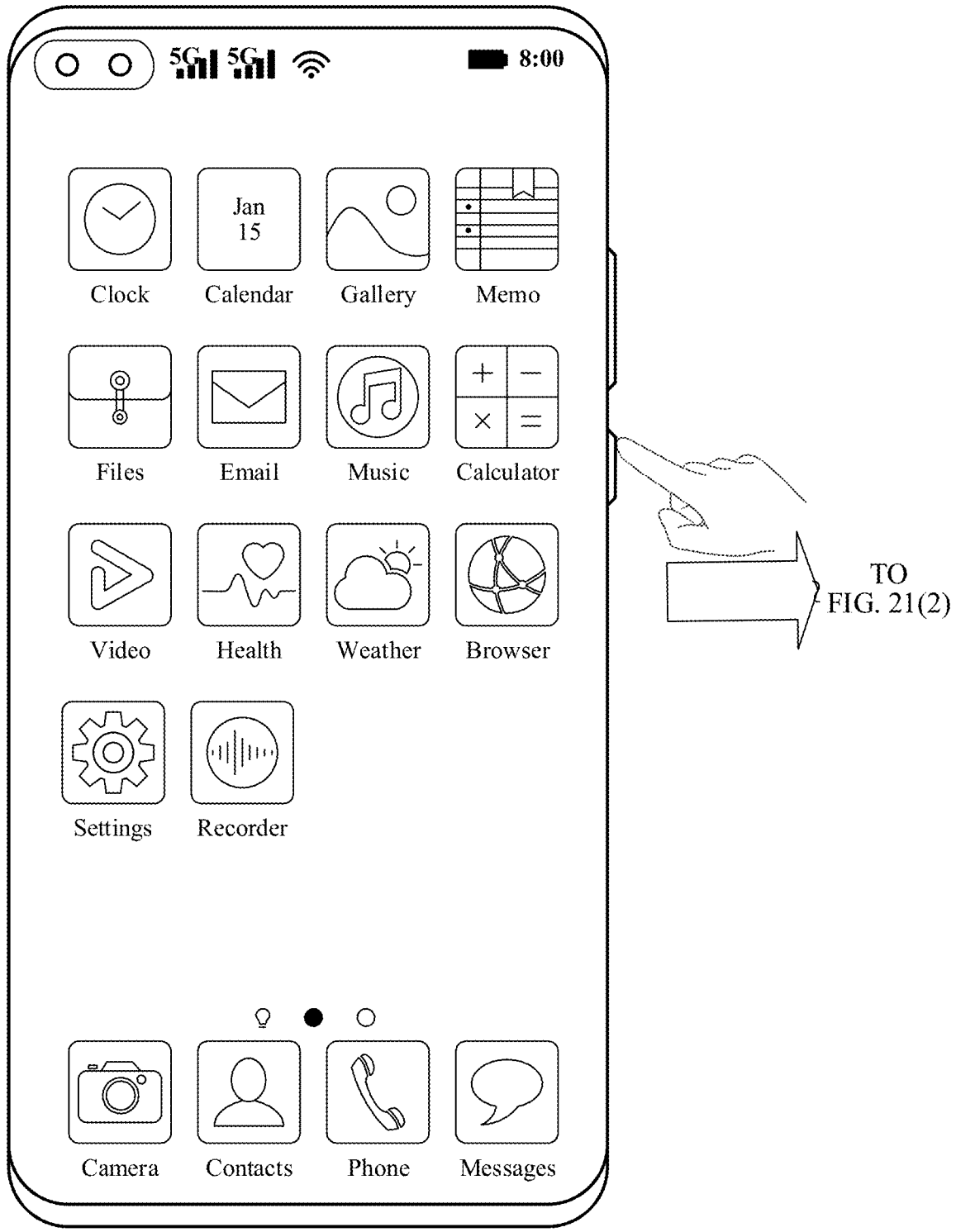
FIG. 21(1) and FIG. 21(2) are a schematic diagram of an example state of a display screen of an electronic device.
Figure 21:
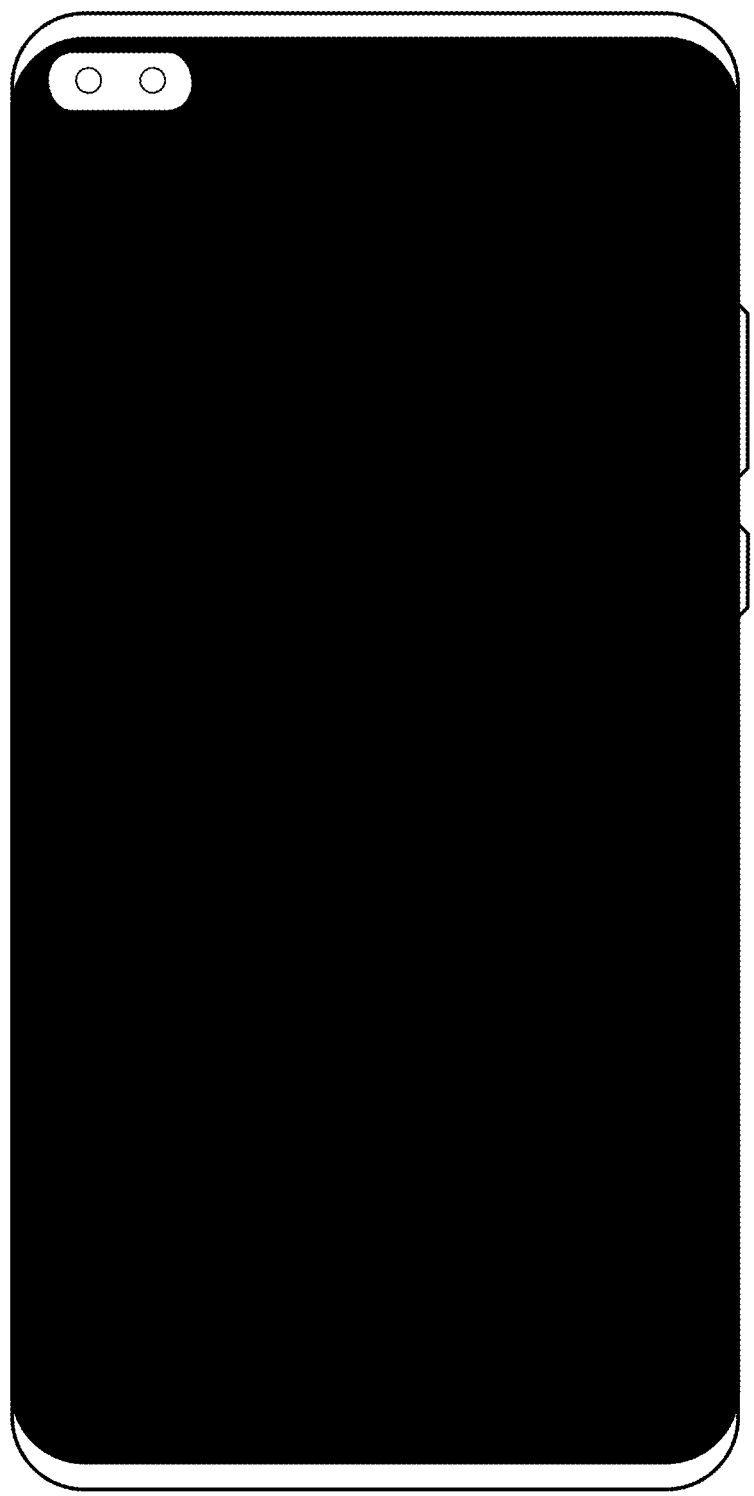

FIG. 20 is another schematic diagram of example non-screen-off detection. Referring to FIG. 20, for example, the awareness service starts keep screen on while looking detection at the moment T1, that is, enables a detection window. For example, preset detection duration is 11 s. In this embodiment, at the moment T2, that is, when the detection duration is 3 s, as shown in FIG. 21(1), the user presses the power key. As shown in FIG. 21(2), in response to a received user operation, the mobile phone enters the screen-off mode, that is, the display screen turns off. Correspondingly, at the moment T2, the awareness module may determine, by using the input management service, that the power key is pressed, and the awareness module may determine that the screen of the mobile phone is locked. According to the related description in FIG. 8, when the awareness module performs keep screen on while looking detection, if any condition in FIG. 8 is triggered, the current detection procedure ends. For example, still referring to FIG. 20, the awareness module ends the current detection at the moment T2, and repeatedly performs S701. For an undescribed part, refer to the foregoing description. Details are not described herein again.

Figure 22:
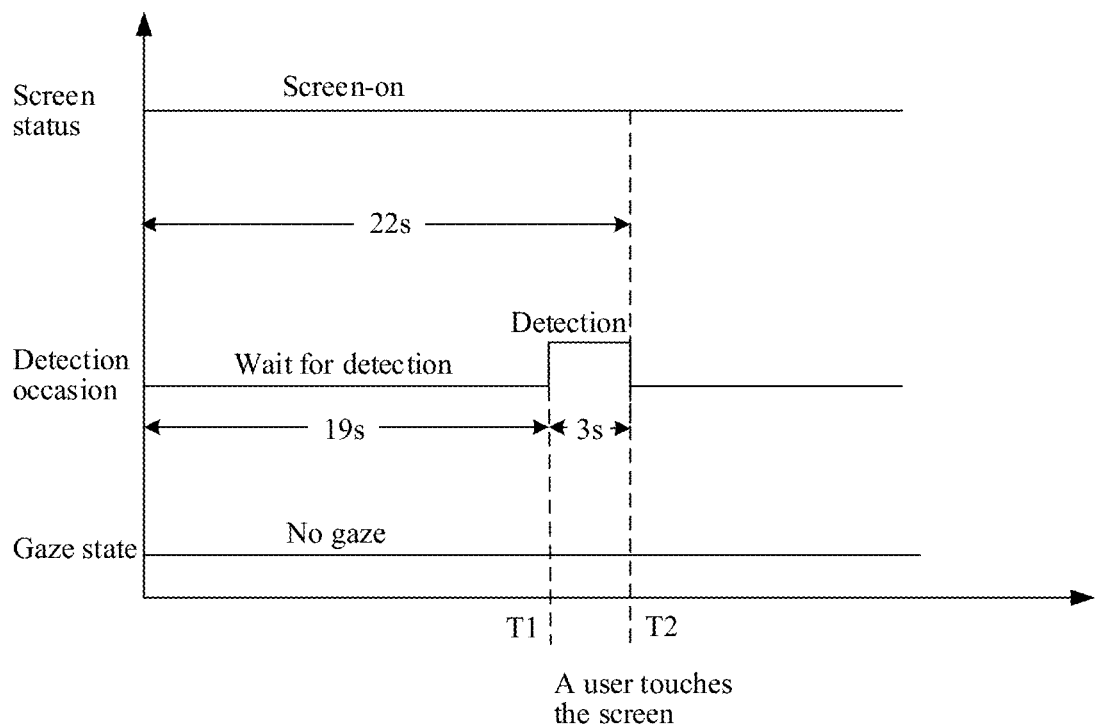
FIG. 22 is a schematic diagram of example non-screen-off detection.

FIG. 22 is another schematic diagram of example non-screen-off detection. Referring to FIG. 22, for example, the awareness service starts keep screen on while looking detection at the moment T1, that is, enables a detection window. At the moment T2, the user touches the display screen, and the display screen keeps in the screen-on state. The awareness service responds to the obtained operation of touching the display screen by the user, and determines that the keep screen on while looking condition is not met. The current detection procedure ends, and the awareness service repeatedly performs S701. It should be noted that, FIG. 22 shows only a scenario of the user touch operation. In another embodiment, the procedure shown in FIG. 22 is also applicable to a scenario in which the awareness service detects that a foreground application enables an application lock in a detection process. That is, if the foreground application enables the application lock at the moment T2, the mobile phone keeps in the screen-on state, the awareness service ends the current detection procedure, and repeatedly performs S701.

Figure 23:
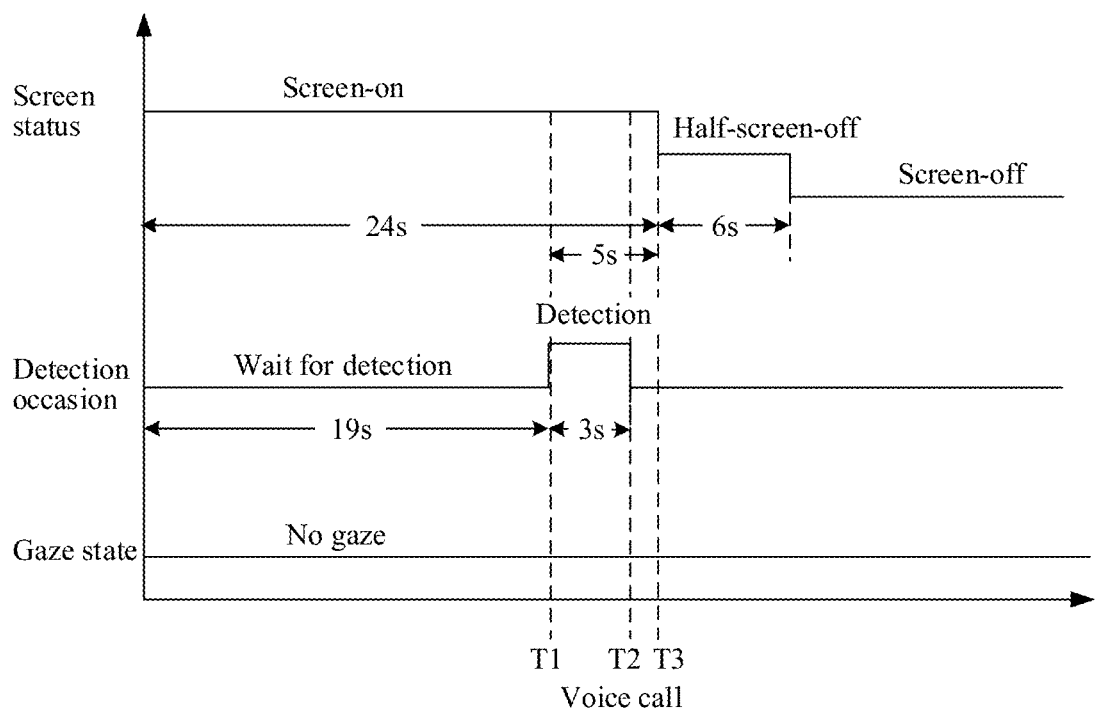
FIG. 23 is a schematic diagram of example non-screen-off detection.

FIG. 23 is another schematic diagram of example non-screen-off detection. Referring to FIG. 23, for example, the awareness service starts keep screen on while looking detection at the moment T1, that is, enables a detection window. At the moment T2, the user answers a voice call. The awareness service detects that the user answers a voice call, and determines that the keep screen on while looking condition is not met. The current detection procedure ends, and the awareness service repeatedly performs S701. For example, at the moment T3, after the display screen is on for 24 s, the display screen enters the half-screen-off state. That is, in the process in which the user answers a voice call, whether the screen of the mobile phone is on does not affect use of the mobile phone by the user. Correspondingly, the mobile phone may enter the half-screen-off state, so as to reduce power consumption. It should be noted that, FIG. 23 shows only an example scenario of a voice call. In another embodiment, the procedure shown in FIG. 23 is also applicable to a scenario in which the awareness service detects that the optical proximity sensor is continuously blocked in a detection process. That is, if the user places the mobile phone face down on the desktop at the moment T2, so that the optical proximity sensor is continuously blocked, correspondingly, the awareness service ends the current detection procedure, and repeatedly performs S701. The mobile phone can enter the half-screen-off state after keeping in the screen-on state for 24 s.

Figure 24:
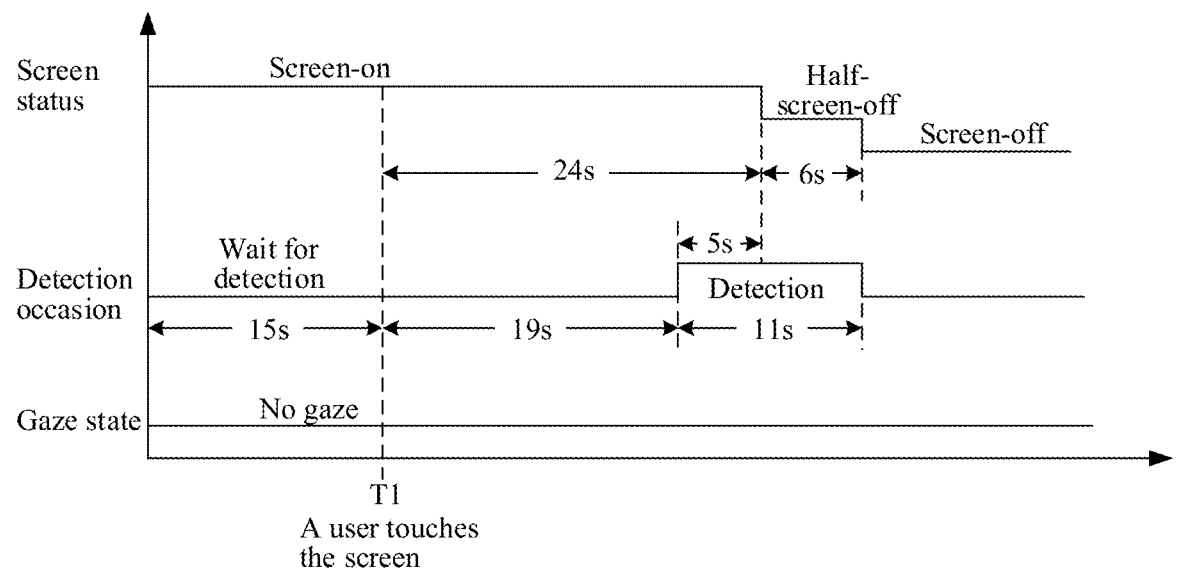
FIG. 24 is a schematic diagram of example non-screen-off detection.

FIG. 24 is another schematic diagram of example non-screen-off detection. Referring to FIG. 24, for example, in a process in which the awareness module performs S705, that is, detects whether a user operation exists within 19 s, the awareness service detects that the user touches the screen at the moment T1 (for example, the 15th second after detection starts). The awareness module may determine, in response to the received operation of touching the screen by the user, that the detection condition is not met, and the current detection procedure ends. The awareness service repeatedly performs S701. For a subsequent process, refer to related descriptions in the foregoing embodiment. Details are not described herein again.

It may be understood that to implement the foregoing functions, the electronic device includes corresponding hardware and/or software modules for performing the functions. Algorithm steps in the examples described with reference to the embodiments disclosed in this specification can be implemented by hardware or a combination of hardware and computer software in this application. Whether a function is performed by hardware or hardware driven by computer software depends on particular applications and design constraints of the technical solutions. A person of skill in the art may use different methods to implement the described functions with reference to embodiments for each particular application, but it should not be considered that the implementation goes beyond the scope of this application.

Figure 25:
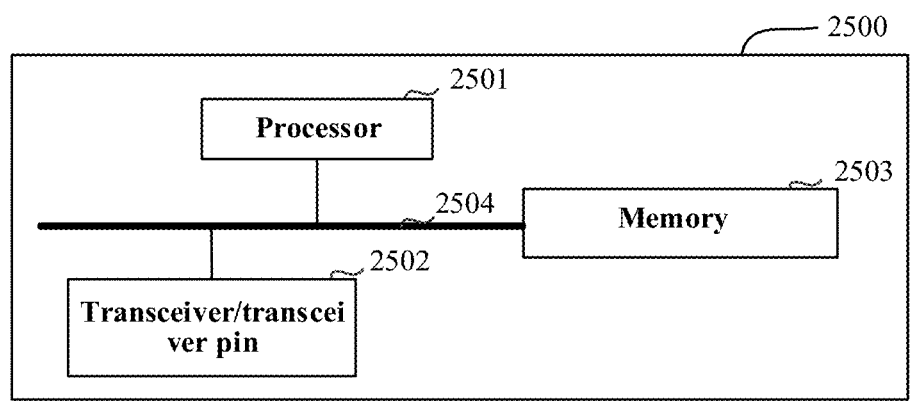
FIG. 25 is a schematic diagram of an example structure of an apparatus.

In an example, FIG. 25 is a schematic block diagram of an apparatus 2500 according to an embodiment of this application. The apparatus 2500 may include: a processor 2501 and a transceiver/transceiver pin 2502, and optionally, further includes a memory 2503.

Components in the apparatus 2500 are coupled together by using a bus 2504. In addition to a data bus, the bus 2504 further includes a power bus, a control bus, and a status signal bus. However, for clear description, various types of buses in the figure are referred to as the bus 2504.

Optionally, the memory 2503 may be configured for instructions in the foregoing method embodiment. The processor 2501 may be configured to: execute the instructions in the memory 2503, control a receive pin to receive a signal, and control a transmit pin to send a signal.

The apparatus 2500 may be the electronic device or a chip in the electronic device in the foregoing method embodiments.

All related content of each step involved in the foregoing method embodiments may be referred to a function description of a corresponding functional module, and details are not described herein.

The embodiments further provide a computer storage medium. The computer storage medium stores computer instructions. When the computer instructions are run on an electronic device, the electronic device is enabled to perform the steps of the related method to implement the method in the foregoing embodiments.

The embodiments further provide a computer program product. When the computer program product is run on a computer, the computer is enabled to perform the foregoing related steps to implement the method in the foregoing embodiments.

In addition, an embodiment of this application further provides an apparatus. The apparatus may be specifically a chip, a component, or a module. The apparatus may include a processor and a memory that are connected. The memory is configured to store computer-executable instructions. When the apparatus runs, the processor may execute the computer-executable instructions stored in the memory, to cause the chip to perform the method in the foregoing method embodiments.

The electronic device, the computer storage medium, the computer program product, or the chip provided in the embodiments is configured to perform the corresponding method provided above. Therefore, for beneficial effects that can be achieved by the electronic device, the computer storage medium, the computer program product, or the chip, refer to the beneficial effects in the corresponding method provided above. Details are not described herein.

Based on the foregoing descriptions of the implementations, a person skilled in the art may clearly understand that, for the purpose of convenient and brief description, division of the foregoing functional modules is taken as an example for illustration. In actual application, the foregoing functions can be allocated to different functional modules and implemented according to a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, the division into the modules or units is merely a logical function division, and there may be another division manner in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, that is, may be located in one place, or may be distributed in a plurality of different places. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

Any content in embodiments of this application and any content in a same embodiment may be freely combined. Any combination of the foregoing content is within the scope of this application.

When the integrated unit is implemented in a form of a software functional unit and sold or used as an independent product, the integrated unit may be stored in a readable storage medium. Based on such an understanding, the technical solutions in embodiments of this application essentially, or the part contributing to the prior art, or all or some of the technical solutions may be implemented in the form of a software product. The software product is stored in a storage medium and includes several instructions for instructing a device (which may be a single-chip microcomputer, a chip, or the like) or a processor (processor) to perform all or some of the steps of the methods described in the embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing describes the embodiments of this application with reference to the accompanying drawings. However, this application is not limited to the foregoing specific implementations. The foregoing specific implementations are merely examples, and are not restrictive. Under the enlightenment of this application, many forms may be further made by a person of ordinary skill in the art without departing from the objective of this application and the protection scope of the claims and shall fall within the protection scope of this application.

Methods or algorithm steps described in combination with the content disclosed in the embodiments of this application may be implemented by hardware, or may be implemented by a processor by executing a software instruction. The software instruction may include a corresponding software module. The software module may be stored in a random access memory (Random Access Memory, RAM), a flash memory, a read only memory (Read Only Memory, ROM), an erasable programmable read-only memory (Erasable Programmable ROM, EPROM), an electrically erasable programmable read-only memory (Electrically EPROM, EEPROM), a register, a hard disk, a removable hard disk, a CD-ROM (CD-ROM), or any other form of storage medium familiar with the art. An example storage medium is coupled to a processor, to enable the processor to read information from and write information to the storage medium. Certainly, the storage medium may also be an integral part of the processor. The processor and the storage medium may be located in the ASIC.

A person skilled in the art may recognize that in the foregoing one or more examples, functions described in the embodiments of this application may be implemented by hardware, software, firmware, or any combination thereof. When implemented by using software, these functions may be stored in a computer readable medium or transmitted as one or more instructions or codes on the computer readable medium. The computer readable medium includes a computer storage medium and a communication medium, where the communication medium includes any medium that facilitates the transfer of a computer program from one place to another. The storage medium may be any available medium accessible to a general-purpose or dedicated computer.

The foregoing describes the embodiments of this application with reference to the accompanying drawings. However, this application is not limited to the foregoing specific implementations. The foregoing specific implementations are merely examples, and are not restrictive. Under the enlightenment of this application, many forms may be further made by a person of ordinary skill in the art without departing from the objective of this application and the protection scope of the claims and shall fall within the protection scope of this application.

What is claimed is:

1. An electronic device, comprising:
one or more processors, a memory, and a fingerprint sensor; and
one or more computer programs, wherein the one or more computer programs are stored in the memory, and when the computer programs are executed by the one or more processors, the electronic device is enabled to perform the following steps:
when the electronic device is in a screen-off state, receiving a first user operation;
changing from the screen-off state to a screen-on state in response to the received first user operation;
receiving a user input enabling a keep screen on while looking feature, where the keep screen on while looking feature enables a user to change the electronic device from a half-screen-off state to a screen-on state, wherein the half-screen-off state is a state in which a screen of the electronic device is darkened with a second brightness that is lower than a first brightness of the screen-on state;
when the electronic device is in the screen-on state, no user operation is received within first duration, and an optical proximity sensor of the electronic device meets a preset condition, starting first detection while the keep screen on while looking feature is enabled, wherein the preset condition corresponding to the optical proximity sensor is that the optical proximity sensor is not shielded;
detecting biometric feature information in the first detection;
at a first moment in the first detection, changing, by the electronic device, from the screen-on state to a half-screen-off state; and
detecting first target biometric feature information at a second moment in the first detection, and changing, by the electronic device, from the half-screen-off state to the screen-on state;
wherein the first target biometric feature information is human eye feature information.

2. The electronic device according to claim 1, wherein when the computer programs are executed by the one or more processors, the electronic device is enabled to perform the following steps:
when the electronic device does not detect a user operation from a third moment at which the screen-off state changes to the screen-on state to the first moment, changing, by the electronic device, from the screen-on state to the half-screen-off state at the first moment;
wherein duration between the third moment and the first moment is second duration, duration between a start moment of the first detection and the first moment is third duration, and the third duration is less than the second duration.

3. The electronic device according to claim 2, wherein when the computer programs are executed by the one or more processors, the electronic device is enabled to perform the following step:
detecting the first target biometric feature information, and ending the first detection.

4. The electronic device according to claim 2, wherein when the computer programs are executed by the one or more processors, the electronic device is enabled to perform the following steps:
when the electronic device changes from the half-screen-off state to the screen-on state and does not receive a user operation within the first duration, and the optical proximity sensor meets the preset condition, starting second detection; and
detecting a second target biometric feature at a fourth moment in the second detection, and controlling the electronic device to keep the screen-on state;
detecting the second target biometric feature, and ending the second detection.

5. The electronic device according to claim 4, wherein when the computer programs are executed by the one or more processors, the electronic device is enabled to perform the following steps:
when the electronic device keeps the screen-on state and does not receive a user operation within the first duration, and the optical proximity sensor meets the preset condition, starting third detection; wherein duration of the third detection is the second duration; and
detecting a third target biometric feature at a fifth moment in the third detection, and controlling the electronic device to keep the screen-on state.

6. The electronic device according to claim 5, wherein when the computer programs are executed by the one or more processors, the electronic device is enabled to perform the following step:
detecting the third target biometric feature, and ending the second detection.

7. The electronic device according to claim 5, wherein duration between a start moment of the second detection and the fourth moment is fifth duration, and duration between a start moment of the third detection and the fifth moment is sixth duration; and the sixth duration is different from the fifth duration.

8. The electronic device according to claim 2, wherein when the computer programs are executed by the one or more processors, the electronic device is enabled to perform the following steps:
when the electronic device changes from the half-screen-off state to the screen-on state and does not receive a user operation within the first duration, and the optical proximity sensor meets the preset condition, starting fourth detection; and
at a sixth moment in the fourth detection, detecting an operation of pressing a power key by a user, and changing, by the electronic device, from the screen-on state to the screen-off state.

9. The electronic device according to claim 8, wherein when the computer programs are executed by the one or more processors, the electronic device is enabled to perform the following step:
detecting the operation of pressing the power key by the user, and ending the fourth detection.

10. The electronic device according to claim 2, wherein when the computer programs are executed by the one or more processors, the electronic device is enabled to perform the following steps:
- when the electronic device changes from the half-screen-off state to the screen-on state and does not receive a user operation within the first duration, and the optical proximity sensor meets the preset condition, starting fifth detection; and
- at a seventh moment in the fifth detection, receiving first voice incoming call information, and ending the fifth detection.

11. The electronic device according to claim 2, wherein when the computer programs are executed by the one or more processors, the electronic device is enabled to perform the following steps:
- when the electronic device changes from the half-screen-off state to the screen-on state and does not receive a user operation within the first duration, and the optical proximity sensor meets the preset condition, starting sixth detection;
- detecting biometric feature information in the sixth detection;
- at an eighth moment in the sixth detection, changing, by the electronic device, from the screen-on state to the half-screen-off state; and
- at a ninth moment, the sixth detection ending, and changing, by the electronic device, from the half-screen-off state to the screen-off state.

12. A display screen control method, applied to an electronic device, comprising:
- when the electronic device is in a screen-off state, receiving a first user operation;
- changing from the screen-off state to a screen-on state in response to the received first user operation;
- receiving a user input enabling a keep screen on while looking feature, where the keep screen on while looking feature enables a user to change the electronic device from a half-screen-off state to a screen-on state, wherein the half-screen-off state is a state in which a screen of the electronic device is darkened with a second brightness that is lower than a first brightness of the screen-on state;
- when the electronic device is in the screen-on state, no user operation is received within first duration, and an optical proximity sensor of the electronic device meets a preset condition, starting first detection while the keep screen on while looking feature is enabled, wherein the preset condition corresponding to the optical proximity sensor is that the optical proximity sensor is not shielded;
- detecting biometric feature information in the first detection;
- at a first moment in the first detection, changing, by the electronic device, from the screen-on state to a half-screen-off state; and
- detecting first target biometric feature information at a second moment in the first detection, and changing, by the electronic device, from the half-screen-off state to the screen-on state;
- wherein the first target biometric feature information is human eye feature information.

13. The method according to claim 12, wherein the changing, by the electronic device, from the screen-on state to a half-screen-off state comprises:
- when the electronic device does not detect a user operation from a third moment at which the screen-off state changes to the screen-on state to the first moment, changing, by the electronic device, from the screen-on state to the half-screen-off state at the first moment;
- wherein duration between the third moment and the first moment is second duration, duration between a start moment of the first detection and the first moment is third duration, and the third duration is less than the second duration.

14. The method according to claim 13, wherein the method further comprises:
- detecting the first target biometric feature information, and ending the first detection.

15. The method according to claim 13, wherein the method further comprises:
- when the electronic device changes from the half-screen-off state to the screen-on state and does not receive a user operation within the first duration, and the optical proximity sensor meets the preset condition, starting second detection; and
- detecting a second target biometric feature at a fourth moment in the second detection, and controlling the electronic device to keep the screen-on state;
- detecting the second target biometric feature, and ending the second detection.

16. The method according to claim 13, wherein the method further comprises:
- when the electronic device changes from the half-screen-off state to the screen-on state and does not receive a user operation within the first duration, and the optical proximity sensor meets the preset condition, starting fourth detection; and
- at a sixth moment in the fourth detection, detecting an operation of pressing a power key by a user, and changing, by the electronic device, from the screen-on state to the screen-off state.

17. The method according to claim 16, wherein the method further comprises:
- detecting the operation of pressing the power key by the user, and ending the fourth detection.

18. A non-transitory computer readable storage medium, comprising a computer program, wherein when the computer program runs on an electronic device, the electronic device is enabled to perform:
- when the electronic device is in a screen-off state, receiving a first user operation;
- changing from the screen-off state to a screen-on state in response to the received first user operation;
- receiving a user input enabling a keep screen on while looking feature, where the keep screen on while looking feature enables a user to change the electronic device from a half-screen-off state to a screen-on state, wherein the half-screen-off state is a state in which a screen of the electronic device is darkened with a second brightness that is lower than a first brightness of the screen-on state;
- when the electronic device is in the screen-on state, no user operation is received within first duration, and an optical proximity sensor of the electronic device meets a preset condition, starting first detection while the keep screen on while looking feature is enabled, wherein the preset condition corresponding to the optical proximity sensor is that the optical proximity sensor is not shielded;
- detecting biometric feature information in the first detection;

at a first moment in the first detection, changing, by the electronic device, from the screen-on state to a half-screen-off state; and detecting first target biometric feature information at a second moment in the first detection, and changing, by the electronic device, from the half-screen-off state to the screen-on state;

wherein the first target biometric feature information is human eye feature information.

19. The non-transitory computer readable storage medium according to claim 18, wherein when the computer program runs on an electronic device, the electronic device is enabled to perform:

when the electronic device does not detect a user operation from a third moment at which the screen-off state changes to the screen-on state to the first moment, changing, by the electronic device, from the screen-on state to the half-screen-off state at the first moment;

wherein duration between the third moment and the first moment is second duration, duration between a start moment of the first detection and the first moment is third duration, and the third duration is less than the second duration.

20. The non-transitory computer readable storage medium according to claim 19, wherein when the computer program runs on an electronic device, the electronic device is enabled to perform:

detecting the first target biometric feature information, and ending the first detection.

* * * * *